United States Patent
Yamashima et al.

(10) Patent No.: US 9,654,543 B2
(45) Date of Patent: May 16, 2017

(54) COMMUNICATION METHOD AND COMMUNICATION PROGRAM

(71) Applicant: FUJITSU LIMITED, Kawasaki-shi, Kanagawa (JP)

(72) Inventors: Hiroyuki Yamashima, Kawasaki (JP); Kazuhiro Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 168 days.

(21) Appl. No.: 14/741,016

(22) Filed: Jun. 16, 2015

(65) Prior Publication Data
US 2016/0014189 A1    Jan. 14, 2016

(30) Foreign Application Priority Data

Jul. 11, 2014   (JP) .................. 2014-143206

(51) Int. Cl.
G06F 15/16   (2006.01)
H04L 29/08   (2006.01)
G06F 9/455   (2006.01)

(52) U.S. Cl.
CPC .......... *H04L 67/02* (2013.01); *G06F 9/45558* (2013.01); *H04L 67/2804* (2013.01); *H04L 67/2823* (2013.01); *H04L 67/322* (2013.01); *G06F 2009/45595* (2013.01)

(58) Field of Classification Search
CPC ....... G06F 2009/45595; G06F 9/45558; H04L 67/02; H04L 67/2804
See application file for complete search history.

(56) References Cited

U.S. PATENT DOCUMENTS

| | | | | |
|---|---|---|---|---|
| 8,320,384 B2* | 11/2012 | Oouchi | .................. | H04L 12/66 370/395.31 |
| 8,345,712 B2* | 1/2013 | Sood | ................. | H04L 29/12481 370/349 |
| 8,943,490 B1* | 1/2015 | Jain | .......................... | G06F 8/65 717/168 |
| 2009/0287955 A1 | 11/2009 | Matsumoto et al. | | |

(Continued)

FOREIGN PATENT DOCUMENTS

JP      2009-278277      11/2009

*Primary Examiner* — Mohamed Wasel
(74) *Attorney, Agent, or Firm* — Fujitsu Patent Center

(57) ABSTRACT

A communication method includes, when a first communication packet transmitted from a first terminal which is deployed in a second physical machine group and included in a first segment is received, storing identification information of the first communication packet transmitted from the first terminal, first transmitting the first communication packet transmitted from the first terminal to the first network device based on path information included in the configuration information when the first communication packet transmitted from the first terminal is a communication packet to a second terminal included in a second segment, when the first communication packet is transmitted from the first network device, and second transmitting the received first communication packet transmitted from the first network device to the second terminal and updating the path information so as to transmit a communication packet transmitted from the first terminal without passing through the first network device.

12 Claims, 30 Drawing Sheets

(56) References Cited

U.S. PATENT DOCUMENTS

| | | | |
|---|---|---|---|
| 2011/0225278 A1* | 9/2011 | Monchiero | H04L 49/901 709/223 |
| 2012/0254353 A1* | 10/2012 | Baba | H04L 12/4633 709/217 |
| 2013/0155906 A1* | 6/2013 | Nachum | H04L 61/103 370/255 |
| 2016/0134526 A1* | 5/2016 | Maino | H04L 45/505 709/226 |

* cited by examiner

FIG.15A
PATH INFORMATION (ROUTER 6A)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A | — | — | — |
| 2 | ROUTER 6D | — | — | — | — | — |
| 3 | ROUTER 6F | — | — | — | — | — |

FIG.15B
PATH INFORMATION (ROUTER 6D)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL B | — | — | — |
| 2 | ROUTER 6A | — | — | — | — | — |
| 3 | ROUTER 6F | — | — | — | — | — |

FIG.16A
PATH INFORMATION(ROUTER 6A)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A | — | — | — |
| 2 | ROUTER 6D | — | — | — | — | — |
| 3 | ROUTER 6F | — | — | — | — | — |
| 4 | ROUTER 6D | VM3F-IP | TUNNEL A | VM3A-IP | VM3A-MAC | — |
| 5 | ROUTER 6F | VM3F-IP | TUNNEL A | VM3A-IP | VM3A-MAC | — |

FIG.16B
PATH INFORMATION(ROUTER 6D)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL B | — | — | — |
| 2 | ROUTER 6A | — | — | — | — | — |
| 3 | ROUTER 6F | — | — | — | — | — |

FIG.17A
PATH INFORMATION(ROUTER 6A)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A | — | — | — |
| 2 | ROUTER 6D | — | — | — | — | — |
| 3 | ROUTER 6F | — | — | — | — | — |
| 4 | ROUTER 6D | VM3F-IP | TUNNEL A | VM3A-IP | VM3A-MAC | — |
| 5 | ROUTER 6F | VM3F-IP | TUNNEL A | VM3A-IP | VM3A-MAC | — |

FIG.17B
PATH INFORMATION(ROUTER 6D)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL B | — | — | — |
| 2 | ROUTER 6A | — | — | — | — | — |
| 3 | ROUTER 6F | — | — | — | — | — |
| 4 | ROUTER 6A | VM3A-IP | — | VM3F-IP | — | ON |

FIG.18A
PATH INFORMATION(ROUTER 6A)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A | — | — | — |
| 2 | ROUTER 6D | — | — | — | — | — |
| 3 | ROUTER 6F | — | — | — | — | — |
| 4 | ROUTER 6D | VM3F-IP | TUNNEL A | VM3A-IP | VM3A-MAC | — |
| 5 | ROUTER 6F | VM3F-IP | TUNNEL A | VM3A-IP | VM3A-MAC | — |

FIG.18B
PATH INFORMATION(ROUTER 6D)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL B | — | — | — |
| 2 | ROUTER 6A | — | — | — | — | — |
| 3 | ROUTER 6F | — | — | — | — | — |
| 4 | ROUTER 6A | VM3A-IP | TUNNEL D | VM3F-IP | — | ON |

FIG.19A
PATH INFORMATION(ROUTER 6A)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A | — | — | — |
| 2 | ROUTER 6D | — | — | — | — | — |
| 3 | ROUTER 6F | — | — | — | — | — |
| 4 | ROUTER 6D | VM3F-IP | TUNNEL A | VM3A-IP | VM3A-MAC | — |
| 5 | ROUTER 6F | VM3F-IP | TUNNEL A | VM3A-IP | VM3A-MAC | — |

FIG.19B
PATH INFORMATION(ROUTER 6D)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL B | — | — | — |
| 2 | ROUTER 6A | — | — | — | — | — |
| 3 | ROUTER 6F | — | — | — | — | — |
| 4 | ROUTER 6A | VM3A-IP | TUNNEL D | VM3F-IP | VM3F-MAC | — |

FIG.20A
PATH INFORMATION(ROUTER 6A)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A | — | — | — |
| 2 | ROUTER 6D | — | — | — | — | — |
| 3 | ROUTER 6F | — | — | — | — | — |
| 4 | ROUTER 6D | VM3F-IP | TUNNEL D | VM3A-IP | VM3A-MAC | — |

FIG.20B
PATH INFORMATION(ROUTER 6D)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL B | — | — | — |
| 2 | ROUTER 6A | — | — | — | — | — |
| 3 | ROUTER 6F | — | — | — | — | — |
| 4 | ROUTER 6A | VM3A-IP | TUNNEL D | VM3F-IP | VM3F-MAC | — |

FIG.21A
PATH INFORMATION (ROUTER 6A)

| NUMBER | ROUTER ID | IP ADDRESS OF DESTINATION TERMINAL | TUNNEL ID | IP ADDRESS OF SOURCE TERMINAL | TIMER |
|---|---|---|---|---|---|
| 1 | — | * | TUNNEL A | — | — |
| 2 | ROUTER 6D | — | — | — | — |
| 3 | ROUTER 6F | — | — | — | — |
| 4 | ROUTER 6D | VM3F-IP | TUNNEL D | VM3A-IP | — |

FIG.21B
PATH INFORMATION (ROUTER 6D)

| NUMBER | ROUTER ID | IP ADDRESS OF DESTINATION TERMINAL | TUNNEL ID | IP ADDRESS OF SOURCE TERMINAL | TIMER |
|---|---|---|---|---|---|
| 1 | — | * | TUNNEL B | — | — |
| 2 | ROUTER 6A | — | — | — | — |
| 3 | ROUTER 6F | — | — | — | — |
| 4 | ROUTER 6A | VM3A-IP | TUNNEL D | VM3F-IP | — |

FIG.26

PATH INFORMATION(ROUTER 16A)

| NUM-BER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A<br>TUNNEL B | — | — | — |
| 2 | ROUTER 16B | — | — | — | — | — |

FIG.27

PATH INFORMATION(ROUTER 16A)

| NUMBER | ROUTER ID | IP ADDRESS OF DESTINATION TERMINAL | TUNNEL ID | IP ADDRESS OF SOURCE TERMINAL | MAC ADDRESS OF SOURCE TERMINAL | TIMER |
|---|---|---|---|---|---|---|
| 1 | — | * | TUNNEL A TUNNEL B | — | — | — |
| 2 | ROUTER 16B | — | — | — | — | — |
| 3 | — | VM13D-IP | TUNNEL A | — | — | — |

FIG.30

PATH INFORMATION(ROUTER 16A)

| NUMBER | ROUTER ID | IP ADDRESS OF DESTINATION TERMINAL | TUNNEL ID (IP ADDRESS OF TERMINAL) | IP ADDRESS OF SOURCE TERMINAL | MAC ADDRESS OF SOURCE TERMINAL | TIMER |
|---|---|---|---|---|---|---|
| 1 | — | * | TUNNEL A | VM3A-IP VM3B-IP | — | — |
| 2 | ROUTER 6D | — | — | — | — | — |
| 3 | ROUTER 6F | — | — | — | — | — |
| 4 | — | VM3F-IP | FW5B | VM3A-IP VM3B-IP | — | — |
| 5 | — | VM3C-IP | TUNNEL A | VM3A-IP VM3B-IP | — | — |

COMMUNICATION METHOD AND COMMUNICATION PROGRAM

CROSS-REFERENCE TO RELATED APPLICATION

This application is based upon and claims the benefit of priority of the prior Japanese Patent Application No. 2014-143206, filed on Jul. 11, 2014, the entire contents of which are incorporated herein by reference.

FIELD

The present invention relates to a communication method and a communication program.

BACKGROUND

Recently, with improvement in performance of physical machines, a virtualization technique of integrating multiple virtual machines (hereinafter, also referred to as VM) into a single physical machine has been studied. For example, the virtualization technique allows, for example, virtualization software (hypervisor) to allocate physical machines to multiple virtual machines and enables providing of a service based on application programs (hereinafter, also referred to as applications) installed in the virtual machines.

When a provider who provides a service using virtual machines constructs a system, a template which is an assembly of information to be used to construct the system may be created in advance. The template is created, for example, based on information of a system previously constructed by the provider. The provider can reduce time or effort for constructing the system by constructing the system based on the template. A provider (seller) who provides the service based on the constructed system may prepare the template.

When a system is constructed based on a template, the system is generally constructed in physical machine groups (for example, physical machine groups equipped in the same data center) which are equipped as close to each other as possible in order to prevent an increase in load of a communication line between data centers. However, for example, in physical machine groups equipped in a single data center, there is a case in which resources to be used to construct the system is not sufficiently secured. In this case, the provider needs to construct a system to be laid across physical machine groups equipped in multiple data centers.

When a system is constructed to be laid across physical machine groups equipped in multiple data centers, communication between the data centers occurs. Accordingly, the provider constructs a system in a state in which devices such as a firewall (hereinafter, also referred to as FW) or a router of which information is not included in the template are added (for example, see Japanese Laid-open Patent Publication No. 2009-278277).

SUMMARY

A template used to construct a system may be on the premise that the system is constructed using physical machine groups equipped in a single data center. When a system laid across multiple data centers is constructed based on the template, for example, routing information (hereinafter, also referred to as path information) of virtual machines in the system is set on the premise that the system is constructed in a single data center. Accordingly, depending on the path information of the virtual machines, for example, even communication between the virtual machines created in the same data center may be performed via another data center. That is, when a system is constructed to be laid across multiple data centers, there is a case in which communication between the virtual machines is not performed via an optimal communication path.

One aspect of the embodiment is a communication method includes: when a first communication packet transmitted from a first terminal which is deployed in a second physical machine group and included in a first segment is received, storing, by a second network device, identification information of the first communication packet transmitted from the first terminal, the second network device being included in a second information processing system that is constructed based on configuration information of a first information processing system including a first network device and that is provided across a first physical machine group in which the first network device is deployed and the second physical machine group in which the second network device not included in the first information processing system is deployed; first transmitting, by the second network device, the first communication packet transmitted from the first terminal to the first network device based on path information included in the configuration information when the first communication packet transmitted from the first terminal is a communication packet to a second terminal included in a second segment; when the first communication packet is transmitted from the first network device, second transmitting, by the second network device, the received first communication packet transmitted from the first network device to the second terminal and updating, by the second network device, the path information so as to transmit a communication packet transmitted from the first terminal without passing through the first network device; and performing, by the second network device, transmission based on the updated path information when a communication packet transmitted from the first terminal to the second terminal is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15A and FIG. 15B are diagrams illustrating details of the path information managing process according to the first embodiment.

FIG. 16A and FIG. 16B are diagrams illustrating details of the path information managing process according to the first embodiment.

FIG. 17A and FIG. 17B are diagrams illustrating details of the path information managing process according to the first embodiment.

FIG. 18A and FIG. 18B are diagrams illustrating details of the path information managing process according to the first embodiment.

FIG. 19A and FIG. 19B are diagrams illustrating details of the path information managing process according to the first embodiment.

FIG. 20A and FIG. 20B are diagrams illustrating details of the path information managing process according to the first embodiment.

FIG. 21A and FIG. 21B are diagrams illustrating a case in which the path information does not include the item of MAC address of a source terminal in the first embodiment.

FIG. 26 is a diagram illustrating the ARP request process in the first embodiment.

FIG. 27 is a diagram illustrating the ARP request process in the first embodiment.

FIG. 30 is a diagram illustrating a path information managing process according to the second embodiment.

DESCRIPTION OF EMBODIMENTS

Configuration of Information Processing System

Figure 1:
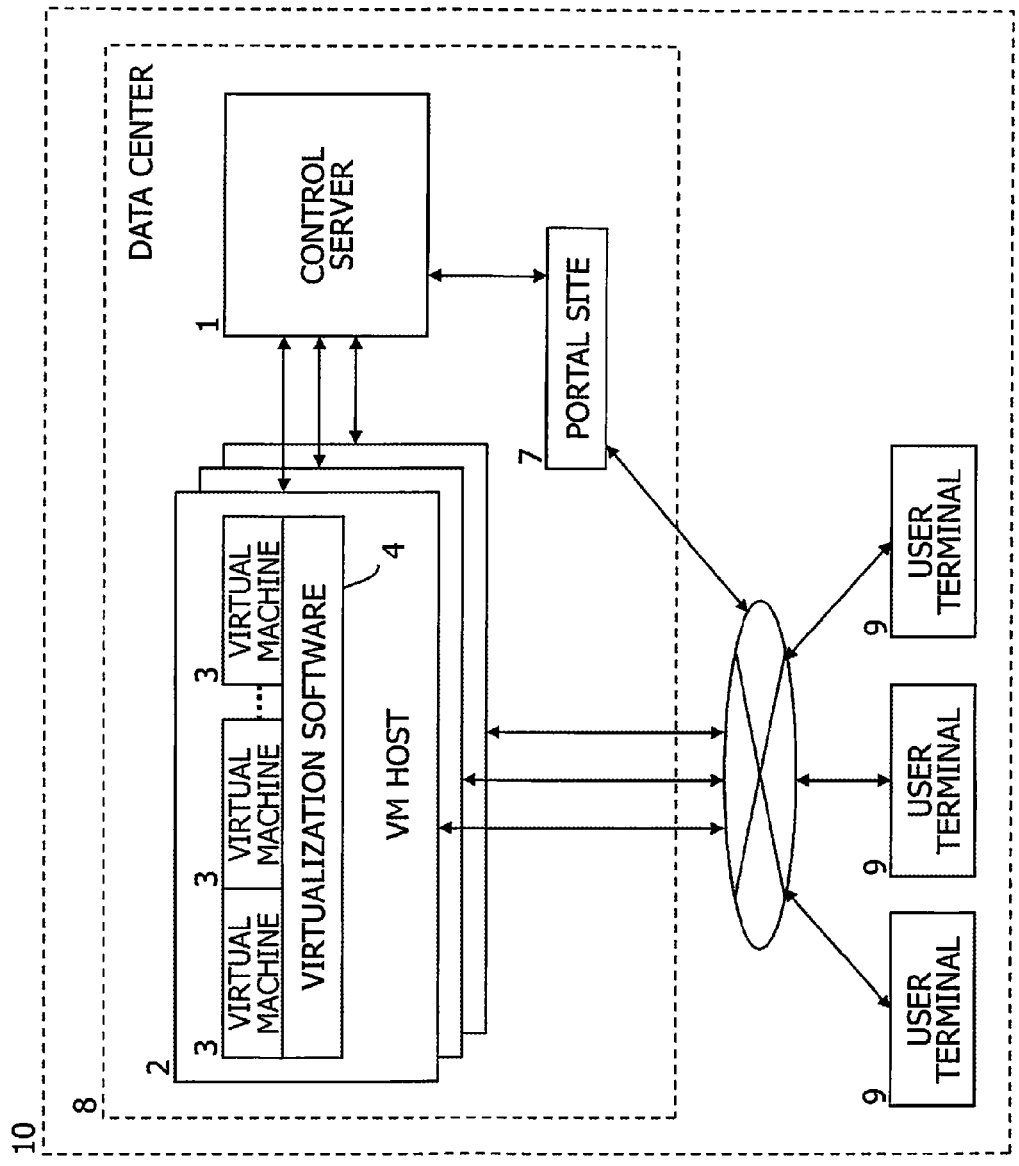
FIG. 1 is a diagram illustrating the entire configuration of an information processing system.

FIG. 1 is a diagram illustrating the entire configuration of an information processing system. In the information processing system 10 illustrated in FIG. 1, a control server 1 and a physical machine 2 (hereinafter, also referred to as a VM host 2) are equipped in a data center 8. A user terminal 9 can access the data center 8 via a network such as Internet or Intranet.

The VM host 2 includes, for example, a single physical machine or multiple physical machines. In the example illustrated in FIG. 1, the VM host 2 includes multiple physical machines and each physical machine includes a CPU, a memory (DRAM), a large-capacity memory such as a hard disk (HDD), and a network. Resources of each physical machine are allocated to multiple virtual machines 3 (hereinafter, also referred to as a terminal 3). The VM host 2 causes the virtual machines, which are created by allocating the resources of the physical machines thereto, to serve as a virtual network device (hereinafter, also simply referred to as a network device) that controls communication between the virtual machines 3.

The control server 1 can communicate with the virtual machines 3 and manages the virtual machines which are created in the VM host 2. The control server 1 may be created, for example, by the virtual machines 3.

The virtual machine 3 provides a user with an infrastructure thereof via the network (hereinafter, also referred to as a cloud service).

The cloud service is a service of providing an infrastructure used to construct and activate a computer system, that is, an infrastructure such as the virtual machines 3 or the network via the network. A user accesses a portal site 7, for example, using a user terminal 9, selects specifications to be used for virtual machines, such as a clock frequency of the CPU, capacity (GB) of the memory, capacity of the hard disk (MB/sec, IOPS), and a communication bandwidth (Gbps) of the network, and concludes a cloud service contract for the virtual machines. The user terminal 9 enables monitoring of activation states of the virtual machines 3, operation on the virtual machines 3, and the like.

Virtualization software 4 is infrastructure software that operates the virtual machines 3 by allocating the CPU, the memory, the hard disk, and the network of the VM host 2 in response to an instruction from the control server 1. The virtualization software 4 operates, for example, in the VM host 2.

In addition to allocation of the resources of the VM host 2 thereto, the virtual machine 3 has image files including an OS, middleware, applications, databases, and the like in the hard disk thereof. The virtual machine 3 writes the image files to the memory from the hard disk, for example, when the virtual machine 3 is started, and performs operations corresponding to a desired service.

Figure 2:
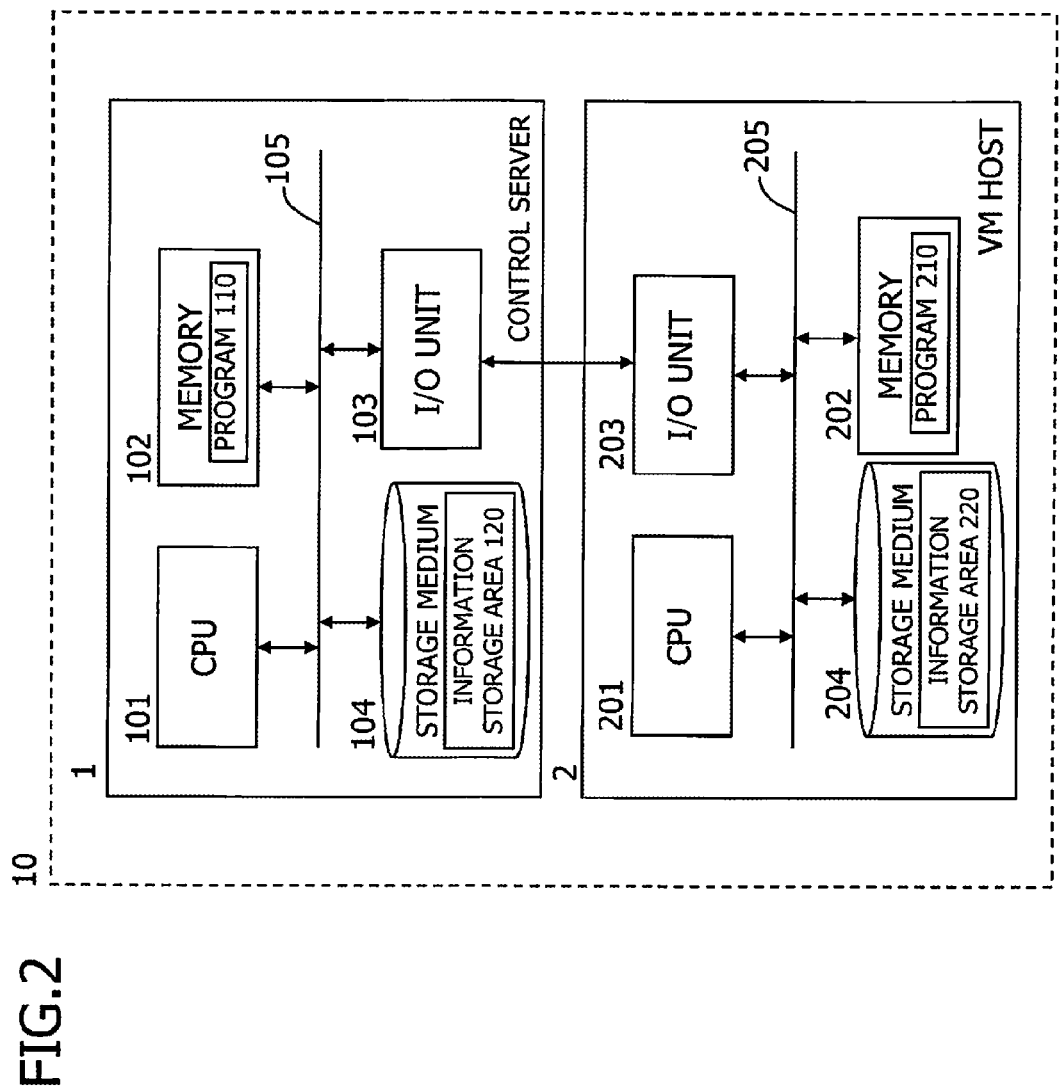
FIG. 2 is a diagram illustrating a hardware configuration of the control server and the VM host.

FIG. 2 is a diagram illustrating a hardware configuration of the control server and the VM host. The control server 1 includes a CPU (processor) 101 as a processor, a memory 102, an external interface (I/O unit) 103, and a storage medium 104. The units are connected to each other via a bus 105. The storage medium 104 stores a program 110 for performing a starting process of the virtual machines 3, for example, in a program storage area (not illustrated) in the storage medium 104. As illustrated in FIG. 2, the CPU 101 loads the program 110 into the memory 102 from the storage medium 104 when executing the program 110 and performs the starting process of the virtual machine 3 in cooperation with the program 110 and the like. The storage medium 104 includes an information storage area 120 in which information used to start the virtual machine 3 or the like is stored.

The VM host 2 includes a CPU (processor) 201 as a processor, a memory 202, an external interface (I/O unit)

203, and a storage medium 204. The units are connected to each other via a bus 205. The storage medium 204 stores a program 210 (hereinafter, also referred to as a path information managing program 210) for performing a process (hereinafter, also referred to as a path information managing process) of managing path information of each terminal in a program storage area (not illustrated) in the storage medium 204. As illustrated in FIG. 2, the CPU 201 loads the program 210 into the memory 202 from the storage medium 204 when executing the program 210, and performs the process of managing path information of each terminal in cooperation with the program 210. The storage medium 204 includes an information storage area 220 in which information used to perform the process of managing path information of each terminal or the like is stored.

Figure 3:
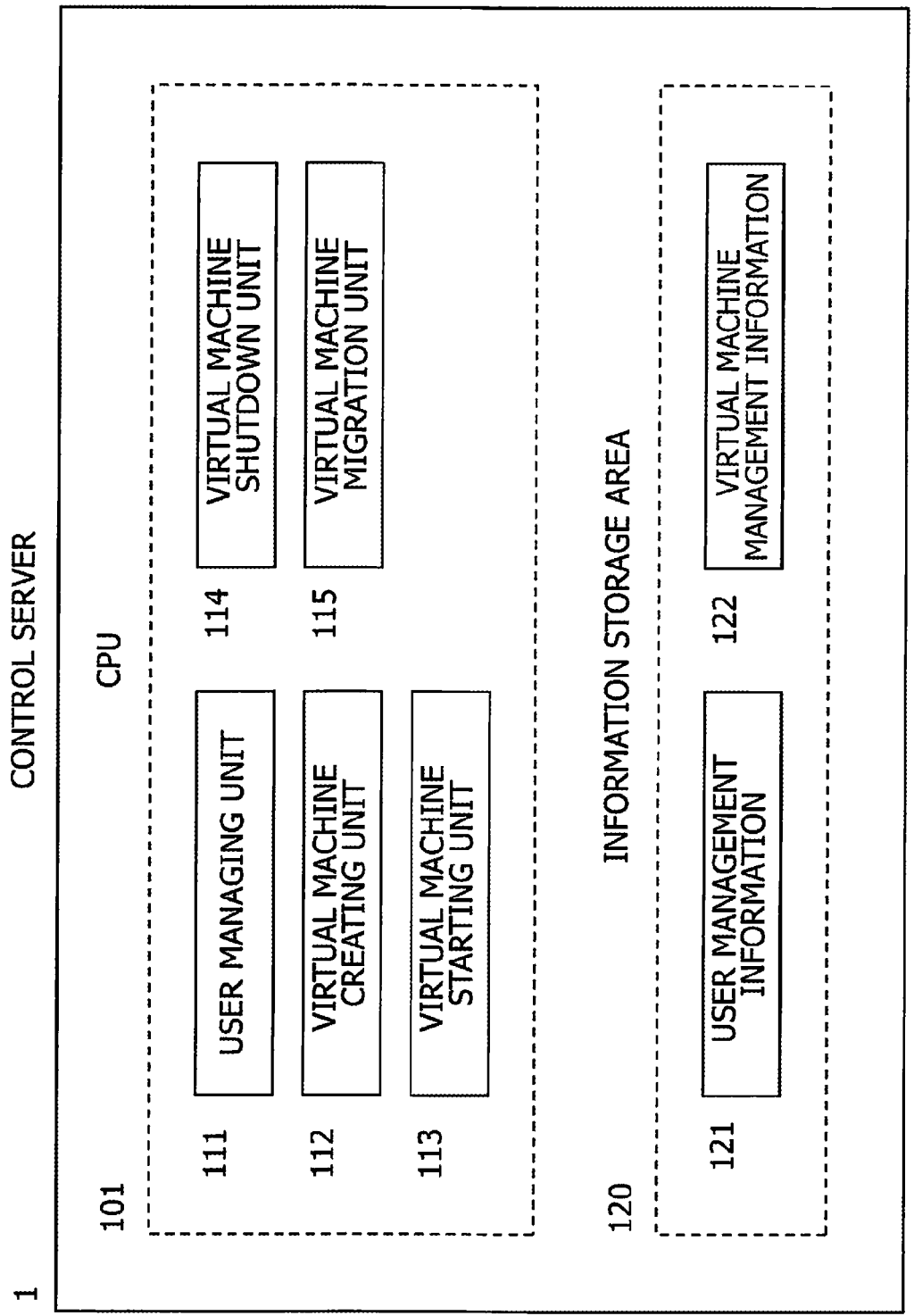
FIG. 3 is a functional block diagram illustrating the control server illustrated in FIG. 2.

FIG. 3 is a functional block diagram illustrating the control server illustrated in FIG. 2. For example, the CPU 101 functions as a user managing unit 111, a virtual machine creating unit 112, a virtual machine starting unit 113, a virtual machine shutdown unit 114, and a virtual machine migration unit 115 in cooperation with the program 110. For example, user management information 121 and virtual machine management information 122 are stored in the information storage area 120.

The user managing unit 111 performs management such as a billing process on a user who has concluded a service contract for the virtual machine 3. The virtual machine creating unit 112 creates the virtual machine 3 by allocating resources of physical machines thereto, for example, based on the cloud service contract. For example, the virtual machine starting unit 113 instructs the virtualization software 4 to start the virtual machine 3. For example, the virtual machine shutdown unit 114 instructs the virtualization software 4 to shut down the virtual machine 3 in a started state. For example, the virtual machine migration unit 115 instructs the virtualization software 4 to cause the virtual machine 3 to migrate.

The user management information 121 is, for example, management information on the virtual machine 3, the user, the contract, and the like. The virtual machine management information 122 is, for example, management information including operation information of the virtual machine 3 transmitted from the virtualization software 4.

Figure 4:
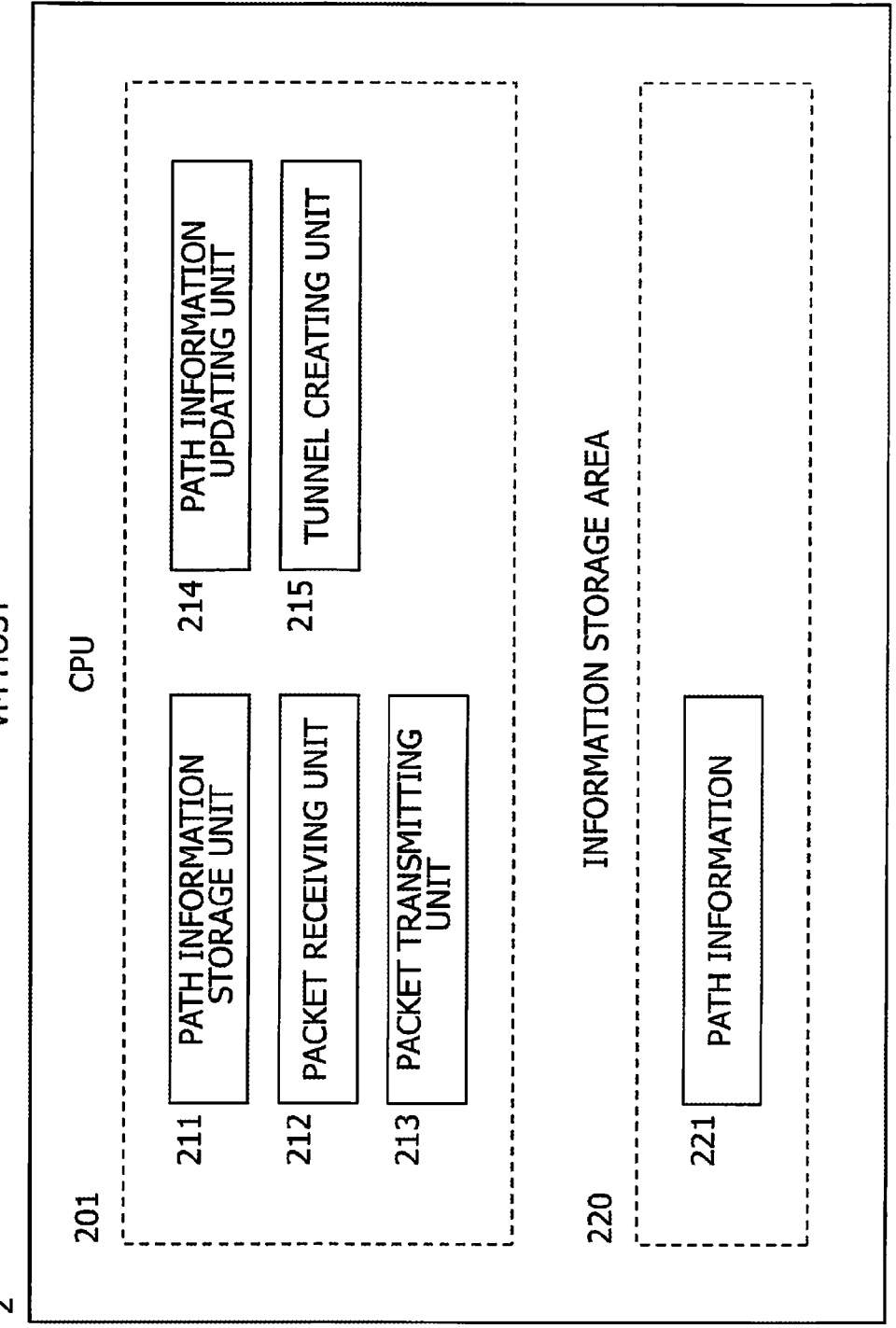
FIG. 4 is a functional block diagram illustrating the VM host illustrated in FIG. 2.

FIG. 4 is a functional block diagram illustrating the VM host illustrated in FIG. 2. For example, the CPU 201 of the VM host 2 functions as a path information storage unit 211, a packet receiving unit 212, a packet transmitting unit 213, a path information updating unit 214, and a tunnel creating unit 215 in cooperation with the program 210. These functions are realized, for example, by one or more network devices (hereinafter, also referred to as terminals) deployed in the VM host 2. Accordingly, multiple network devices may have the same functions. The network device is, for example, a router that performs communication between multiple segments.

In FIG. 4, for example, path information 221 is stored in the information storage area 220. A case in which the network device deployed in the VM host 2 realizes the path information storage unit 211, the packet receiving unit 212, the packet transmitting unit 213, the path information updating unit 214, and the tunnel creating unit 215 will be described below.

The path information storage unit 211 stores, for example, information on a communication packet (hereinafter, also referred to as a packet) which is received by the network device deployed in the VM host 2. Specifically, the path information storage unit 211 stores information on a received communication packet (hereinafter, also referred to as information on a data communication packet or identification information of a communication packet) (hereinafter, information stored based on the information on a communication packet is also referred to as path information 221) when a communication packet from a terminal (hereinafter, also referred to as a first terminal) in a segment (hereinafter, also referred to as a first segment), which can communicate with the network device, to a terminal (hereinafter, also referred to as a second terminal) in another segment (hereinafter, also referred to as a second segment), which can communicate with the network device, has been received. The information on a communication packet includes, for example, a source IP address or a destination IP address of the communication packet. Details of the information on a communication packet will be described later.

The packet receiving unit 212 receives, for example, a communication packet transmitted from the first terminal or the like. The packet transmitting unit 213 transmits a communication packet to a destination IP address of the communication packet, for example, with reference to the destination IP address of the communication packet.

For example, the path information updating unit 214 updates the path information 221 stored in the path information storage unit 211. For example, the path information updating unit 214 sets information on communication between terminals to be performed via a shorter path by updating the path information 221.

The tunnel creating unit 215 creates a communication tunnel (hereinafter, also referred to as a tunnel) to complete the communication between terminals using only communication in the same VM host 2 (without passing through another VM host 2), for example, when the communication between terminals in the VM host 2 is performed via another VM host 2. The tunnel creating unit 215 creates a communication tunnel, for example, in response to updating of the path information 221 by the path information updating unit 214.

A communication tunnel is, for example, a virtual communication line that connects two points in the network. Specifically, a communication packet which is transmitted and received via the communication tunnel is encrypted (encapsulated), for example, by a protocol different from the protocol for allowing communication in the network. Accordingly, even when the communication packet which is transmitted and received via the communication tunnel is transmitted and received, for example, by sharing a physical communication line with a communication packet transmitted by another user, it is possible to prevent wiretapping or falsification of the communication packet and the like.

[Template]

Figure 5:
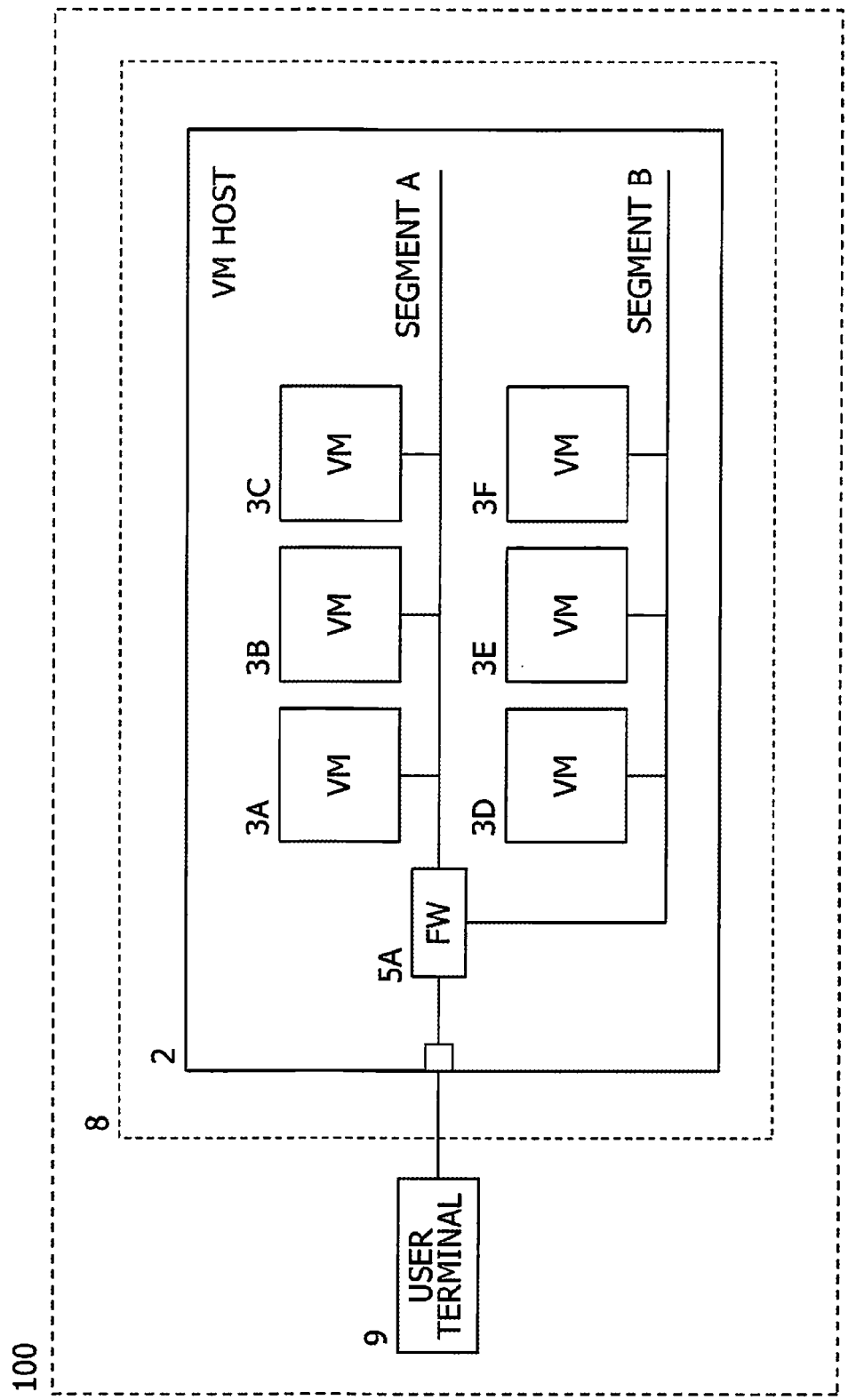
FIG. 5 is a diagram illustrating an information processing system including virtual machines.
Figure 6:
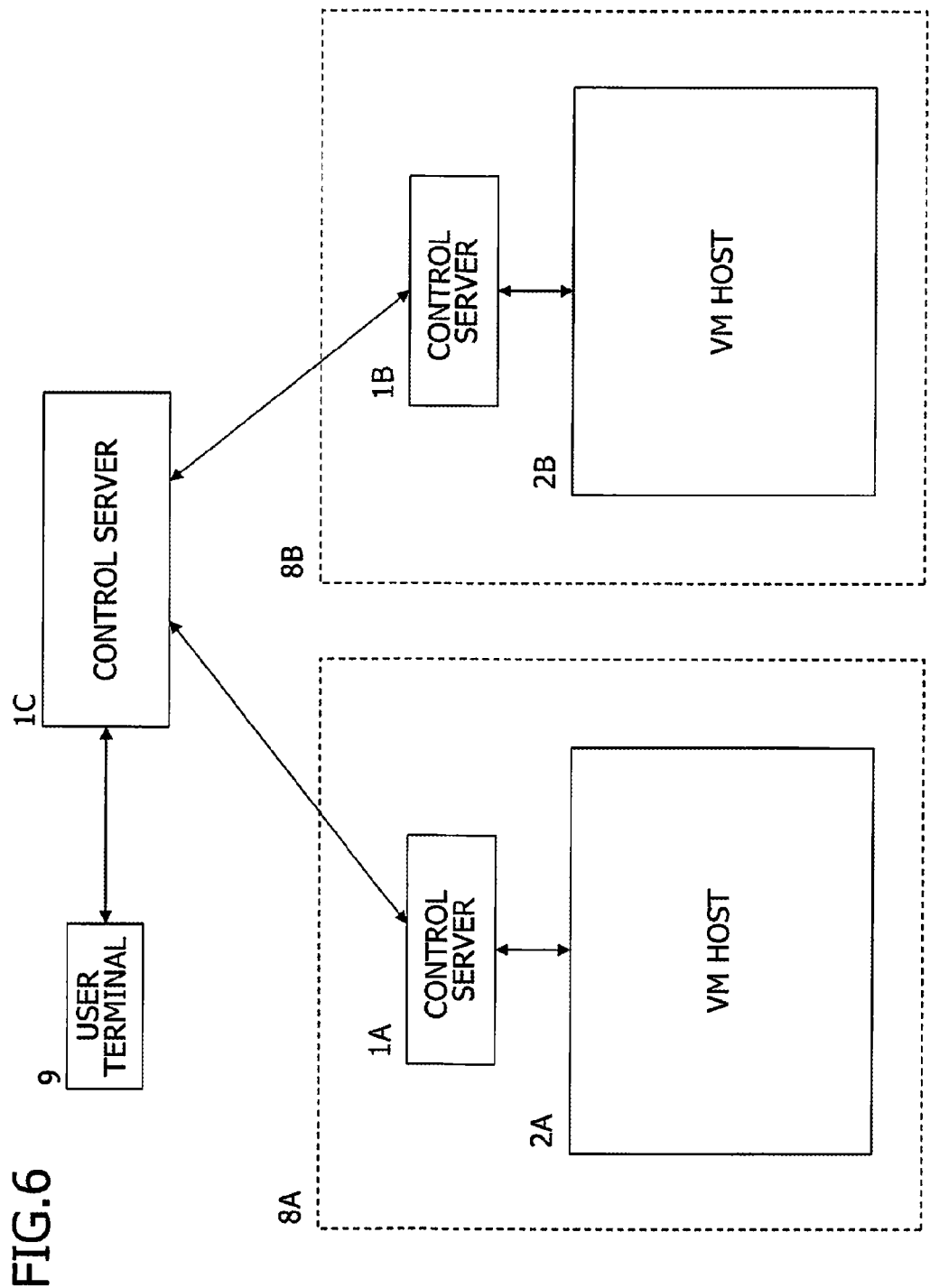
FIG. 6 is a diagram illustrating an information processing system which is constructed using a template.
Figure 7:
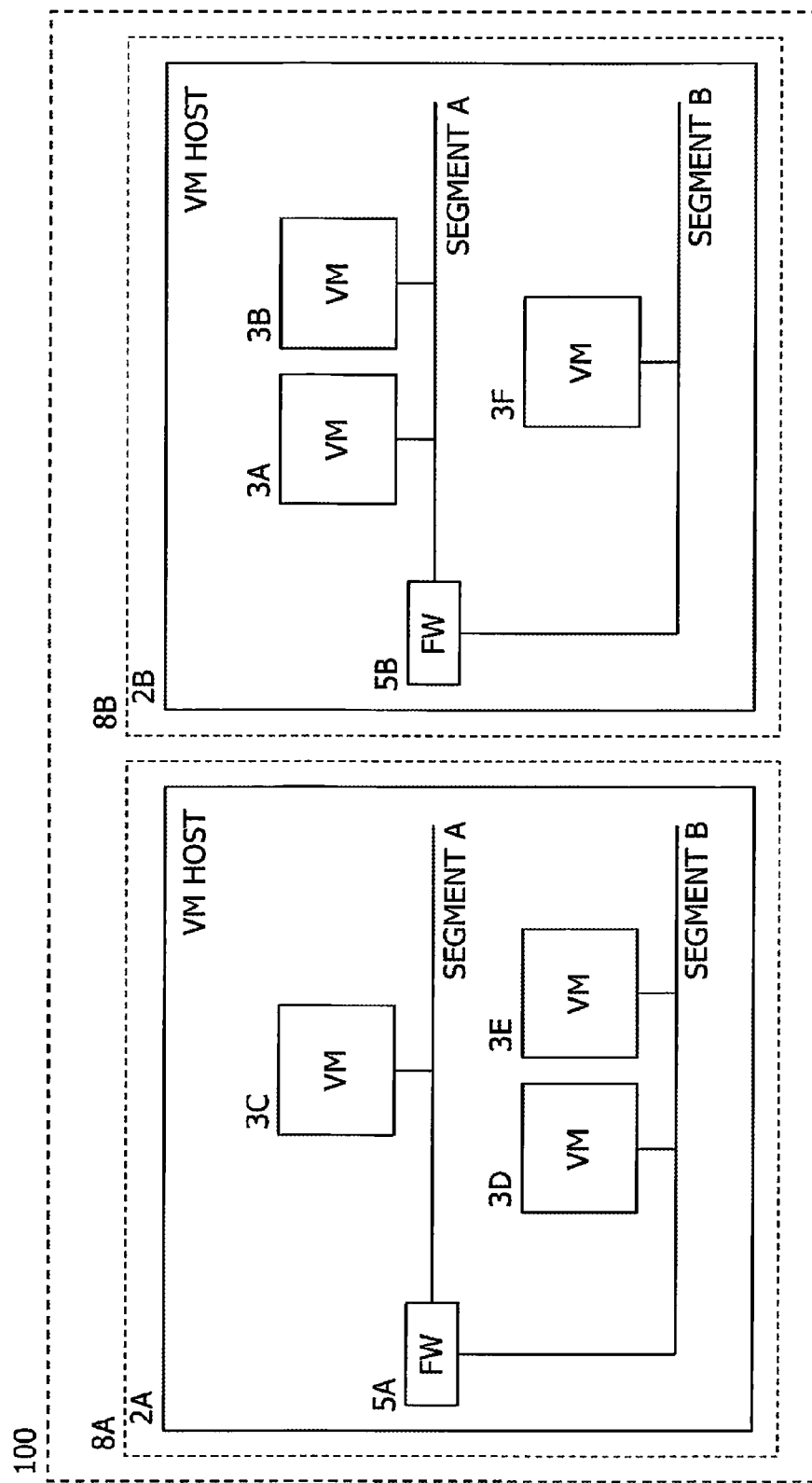
FIG. 7 is a diagram illustrating an information processing system which is constructed using a template.
Figure 8:
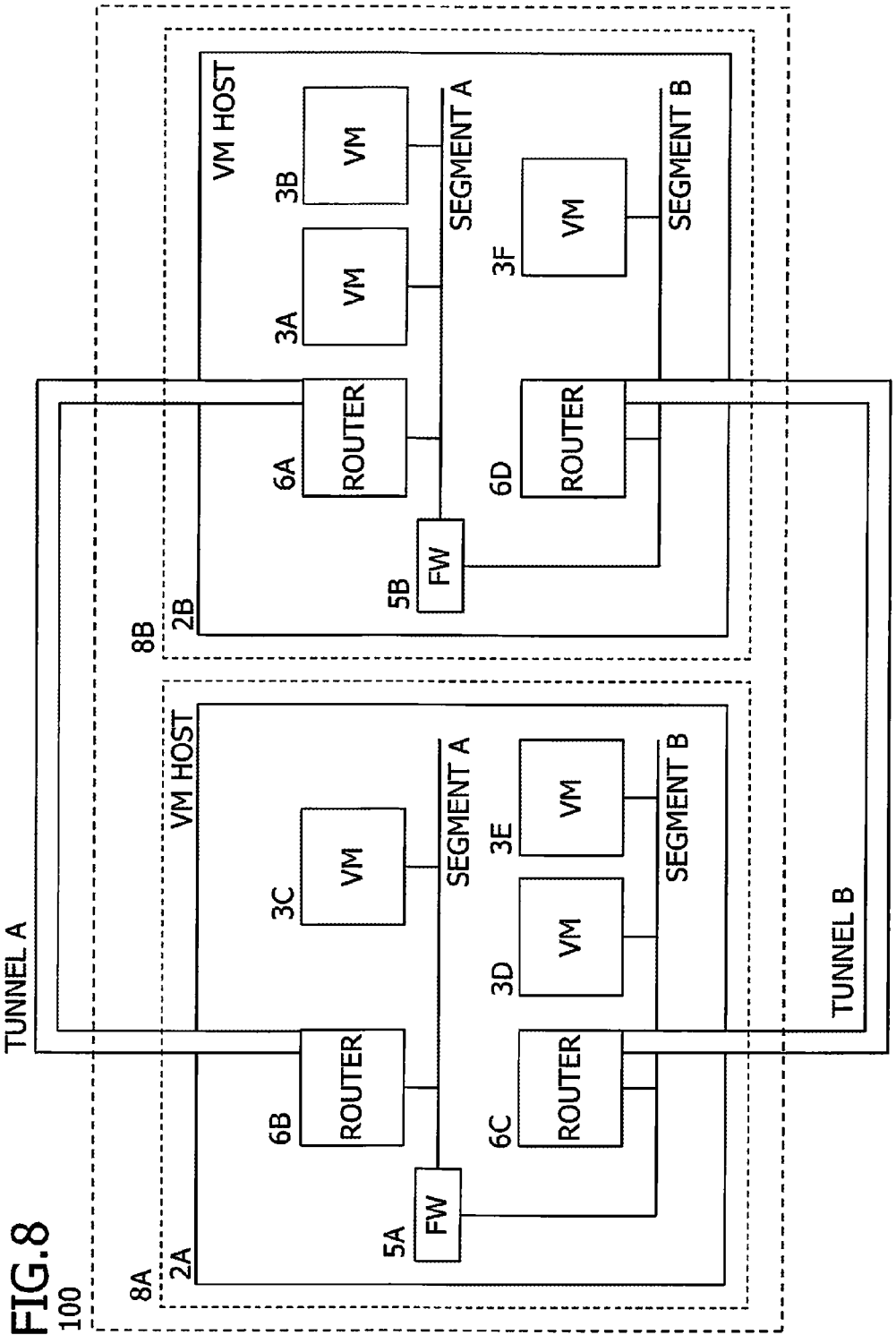
FIG. 8 is a diagram illustrating an information processing system which is constructed using a template.

Now, a template will be described. FIG. 5 is a diagram illustrating an information processing system including virtual machines. FIG. 6 to FIG. 8 are diagrams illustrating an information processing system which is constructed using a template.

The information processing system 100 (hereinafter, also referred to as a first information processing system) in the example illustrated in FIG. 5 is, for example, an information processing system which was constructed in the past by a provider. In the example illustrated in FIG. 5, virtual machines 3A, 3B, and 3C are deployed in Segment A in the VM host 2, and virtual machines 3D, 3E, and 3F are deployed in Segment B in the VM host 2. Segment A and Segment B are connected to a firewall 5A, and the virtual machines of Segment A and the virtual machines of Segment B have to communicate with each other via the firewall 5A.

Accordingly, the virtual machines of Segment A and the virtual machines of Segment B can communicate with each other only when the communication is permitted by setting of the firewall 5A.

For example, when a user accesses the virtual machines using the user terminal 9, the user accesses the virtual machines via the firewall 5A. Accordingly, it is possible to guarantee security of the virtual machines. Specifically, for example, when the user terminal 9 can access only the virtual machines deployed in Segment B, it is possible to inhibit the user terminal 9 from accessing the virtual machines deployed in Segment A.

In the information processing system illustrated in FIG. 5, multiple information processing systems having the same configuration may have to be constructed depending on purposes of the information processing system. In this case, a provider may prepare a template to be used to construct the information processing system. The template is an assembly of information for constructing an information processing system. Specifically, the template includes, for example, capacity (GB) of virtual machines, the number of virtual machines, the type of an OS, information of an installed application, and information of the network. The template may be prepared, for example, based on the information processing system which was constructed and stably activated in the past. That is, when multiple information processing systems having the same configuration need to be constructed, the provider constructs a system using the template, thereby reducing time or effort for constructing the system.

When the provider constructs a system, an information processing system is preferably constructed, for example, in a single physical machine or a physical machine group (hereinafter, also referred to as a region) equipped in the same data center or adjacent multiple data centers in order to prevent an increase in load of a communication line. However, resources used to construct the information processing system may be limited. In this case, the information processing system laid across multiple regions may be constructed using a template based on the information processing system constructed in the same region.

FIG. 6 illustrates an example in which an information processing system laid across multiple regions is constructed. Specifically, a case in which the information processing system 100 illustrated in FIG. 5 is constructed on the information processing system 10 described with reference to FIG. 1 to FIG. 4 using a template (hereinafter, also referred to as a template or configuration information), which is designated by a user, based on the information processing system 100 illustrated in FIG. 5 will be described below.

In the example illustrated in FIG. 6, when a control server 1C receives information of the template selected by a user from the user terminal 9, the control server 1C determines a region in which the information processing system 100 based on the template designated by the user can be constructed. In the example illustrated in FIG. 6, the control server 1C transmits, for example, a resource state acquisition request of a VM host 2A and a VM host 2B to control servers 1A and 1B that manages resource states of the VM host 2A equipped in a region 8A and the VM host 2B equipped in a region 8B. Then, the control server 1C grasps a region in which the information processing system 100 can be constructed based on the resource state acquisition received from the control servers 1A and 1B, and determines a region in which the information processing system 100 is to be constructed.

In the example illustrated in FIG. 6, there are cases in which the VM host 2A of the region 8A does not correspond to the OS version of the virtual machine 3A illustrated in FIG. 5 and the VM host 2B of the region 8B does not correspond to the OS version of the virtual machine 3D illustrated in FIG. 5. That is, in this case, the virtual machine 3A cannot (is not enabled to) be deployed in the VM host 2A and the virtual machine 3D cannot (is not enabled to) be deployed in the VM host 2B. Accordingly, in the example illustrated in FIG. 6, the information processing system 100 cannot (is not enabled to) be constructed in a single region.

FIG. 7 illustrates an example in which the information processing system 100 is constructed to be laid across the VM host 2A and the VM host 2B based on the template described with reference to FIG. 5.

In the example illustrated in FIG. 7, VM hosts 2A and 2B are equipped in the regions 8A and 8B, respectively (hereinafter, the information processing system 100 laid across the regions 8A and 8B is also referred to as a second information processing system). Virtual machine 3C is deployed in Segment A in the VM host 2A and virtual machines 3D and 3E are deployed in Segment B in the VM host 2A. Segment A and Segment B in the VM host 2A are connected to a firewall 5A, and the virtual machine of Segment A and the virtual machines of Segment B need to communicate with each other via the firewall 5A. Virtual machines 3A and 3B are deployed in Segment A in the VM host 2B, and virtual machine 3F is deployed in Segment B in the VM host 2B. Segment A and Segment B in the VM host 2B are connected to a firewall 5B, and the virtual machines of Segment A and the virtual machine of Segment B need to communicate with each other via the firewall 5B.

That is, in the information processing system in the example illustrated in FIG. 7, the firewall 5A deployed in the information processing system in the example illustrated in FIG. 5 is deployed in the region 8A, and the firewall 5B not deployed in the information processing system in the example illustrated in FIG. 5 is deployed in the region 8B. On the other hand, the firewalls 5A and 5B are connected to the outside (for example, the Internet, the Intranet, or the user terminal 9) via a communication line not illustrated.

In the example illustrated in FIG. 7, the information processing system 100 is constructed to be laid across the regions 8A and 8B based on the template of the information processing system 100. In FIG. 7, the virtual machine 3C deployed in the VM host 2A and the virtual machines 3A and 3B deployed in the VM host 2B are virtual machines deployed in the same segment A. Accordingly, for example, when the virtual machine 3C transmits a broadcast packet, the broadcast packet needs to be transmitted to the virtual machines 3A and 3B. Accordingly, communication between the VM host 2A and the VM host 2B needs to be enabled for each segment.

Specifically, as illustrated in FIG. 8, routers 6B and 6C are deployed in Segments A and B in the VM host 2A, respectively, and routers 6A and 6D are deployed in Segments A and B in the VM host 2B. Tunnel A enabling communication between the router 6A and the router 6B and Tunnel B enabling communication between the router 6C and the router 6D are set. For example, when the router 6A receives a communication packet from the virtual machine 3A to the virtual machine 3C, the router 6A is set to transmit the received communication packet via Tunnel A to the router 6B. The same setting is performed on the routers 6B, 6C, and 6D. Accordingly, communication between the virtual machines deployed in the same segment can be enabled regardless of the difference in region in which the virtual machines are deployed. In the example illustrated in FIG. 8, it is assumed that the path information storage unit 211, the packet receiving unit 212, the packet transmitting unit 213, the path information updating unit 214, the tunnel creating unit 215, and the path information 221 which have been described with reference to FIG. 4 are included in each of the router 6A, 6B, 6C, and 6D. Since Tunnels A and B are tunnels not laid across different segments, Tunnels A and B are, for example, L2 tunnels that encapsulate information including an IP address and a MAC address of a source terminal and an IP address and a MAC address of a destination terminal and add the information to a communication packet.

In the information processing system 100 illustrated in FIG. 5, for example, the segment in which the virtual machine 3A is deployed is different from the segment in which the virtual machine 3F is deployed. Accordingly, the virtual machine 3A is set to perform communication toward the firewall 5A when communicating with the virtual machine 3F. That is, in the information processing system 100, communication between virtual machines of different segments is performed via the firewall 5A which is a default routing.

The information processing system 100 illustrated in FIG. 8 is constructed based on the template of the information processing system 100. Accordingly, when the virtual machine 3A in FIG. 8 communicates with the virtual machine 3F, the communication is performed toward the firewall 5A. Specifically, in the example illustrated in FIG. 8, when the virtual machine 3A communicates with the virtual machine 3F, a communication packet transmitted from the virtual machine 3A is transmitted in the order of (1) the router 6A, (2) Tunnel A, (3) the router 6B, and (4) the firewall 5A. Then, the communication packet transmitted from the virtual machine 3A is transmitted to Segment B in the VM host 2A by the firewall 5A, and is then transmitted in the order of (5) the router 6C, (6) Tunnel B, (7) the router 6D, and (8) the virtual machine 3F. That is, in the example illustrated in FIG. 8, the virtual machine 3A and the virtual machine 3F are virtual machines deployed in the same VM host 2B, but are set to communicate via the VM host 2A.

On the contrary, for example, a method of changing the setting of the virtual machine 3A such that the communication packet from the virtual machine 3A to the virtual machine 3F is not transmitted to the firewall 5A is considered. Specifically, for example, the virtual machine 3A is set such that the communication packet from the virtual machine 3A to the virtual machine 3F is transmitted to the firewall 5B. Accordingly, the communication packet from the virtual machine 3A to the virtual machine 3F can be transmitted to the virtual machine 3F via the firewall 5B. Therefore, it is possible to transmit a communication packet from the virtual machine 3A to the virtual machine 3F without passing through the VM host 2A. However, the terminals of which information are included in the template of the information processing system 100 illustrated in FIG. 5 are selected by the user. Accordingly, there is a case in which the provider cannot (is not able to) change the settings thereof. That is, in the example illustrated in FIG. 8, the provider cannot (is not able to) change the settings of the virtual machines 3A, 3B, 3C, 3D, 3E and 3F and the firewall 5A.

On the other hand, in the information processing system 100 illustrated in FIG. 8, information of the firewall 5B and the routers 6A, 6B, 6C, and 6D is not included in the template of the information processing system 100. That is, the provider can change the settings of the firewall 5B and the routers 6A, 6B, 6C, and 6D. Accordingly, the provider can set the router 6A and the like in advance so as to complete the communication using only the communication in the same VM host. However, it may take enormous time and effort to perform the settings depending on the scale of the network. In the information processing system 100 illustrated in FIG. 8, for example, migration of causing a virtual machine created in a certain VM host to migrate to another VM host may be performed depending on a change in operation state or the like. Accordingly, the provider needs to perform the setting again whenever the configuration of the information processing system 100 is changed due to the migration or the like.

Therefore, in this embodiment, in the information processing system constructed to be laid across multiple regions, when communication in the same region is performed via another region, the path information is updated so as not to perform the communication via another region, thereby achieving enhancement in efficiency of the communication.

First Embodiment

Figure 9:
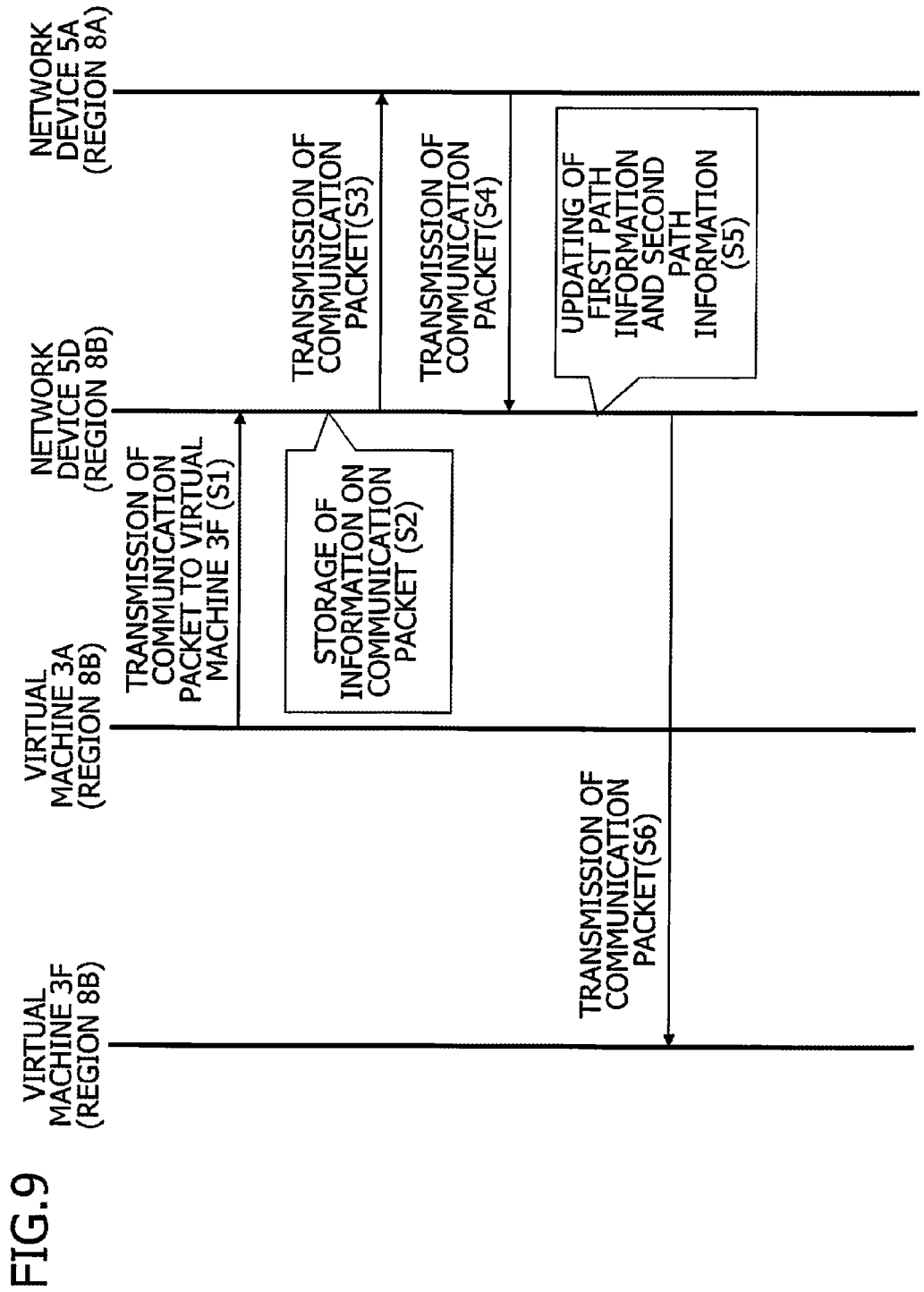
FIG. 9 is a sequence chart schematically illustrating a process flow of a path information managing process according to the first embodiment.
Figure 10:
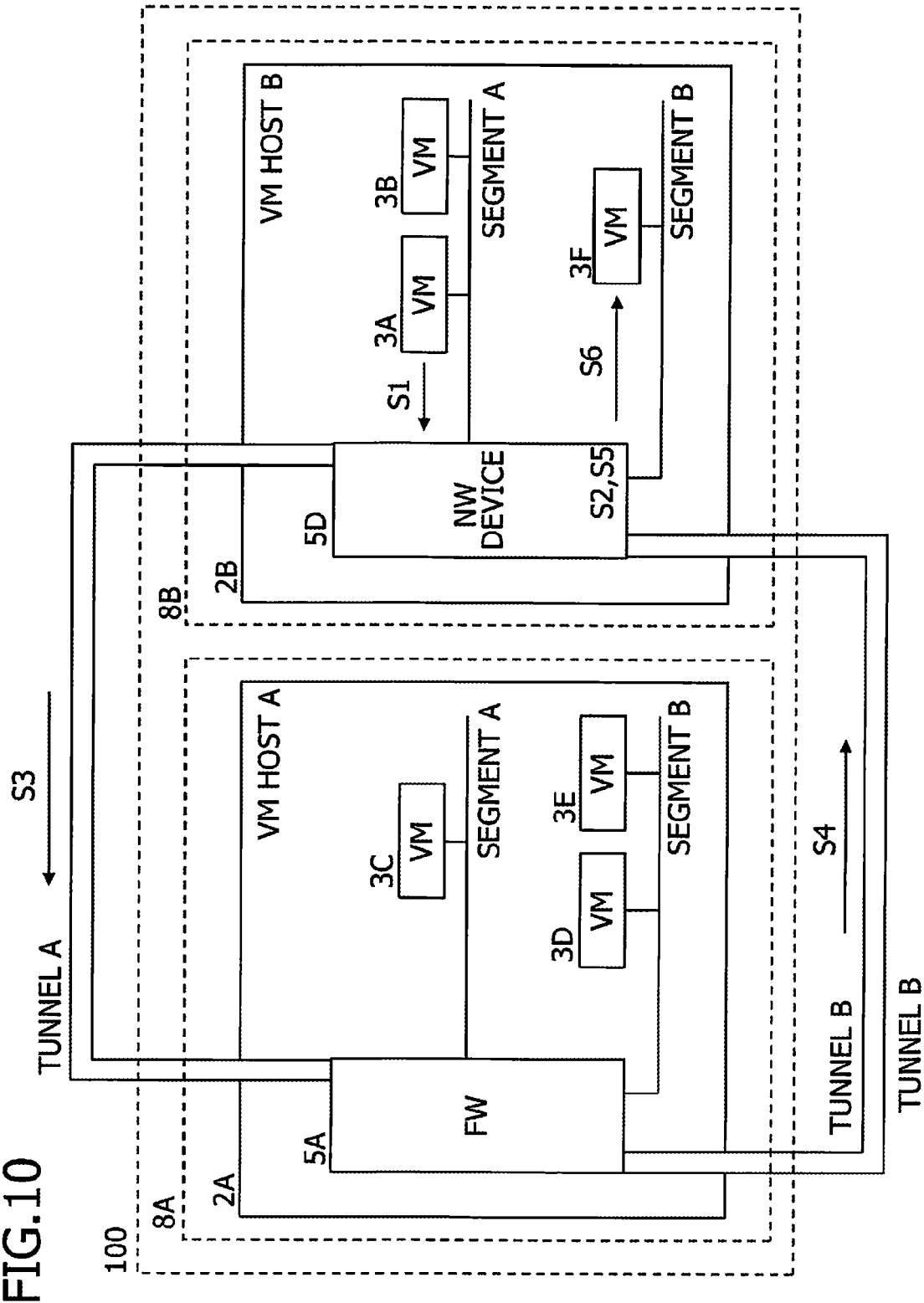
FIG. 10 is a diagram schematically illustrating a process flow of the path information managing process according to the first embodiment.

A first embodiment will be described below. FIG. 9 is a sequence chart schematically illustrating a process flow of a path information managing process according to the first embodiment. FIG. 10 is a diagram schematically illustrating a process flow of the path information managing process according to the first embodiment. The path information managing process illustrated in FIG. 9 will be schematically described with reference to FIG. 10.

[Configuration of Information Processing System of FIG. 10]

First, the configuration of the information processing system 100 in the example illustrated in FIG. 10 will be described. In the example illustrated in FIG. 10, unlike the example illustrated in FIG. 8, the firewall 5A (hereinafter, also referred to as a first network device 5A) also serves as the routers 6B and 6C and a network device 5D (hereinafter, also referred to as a second network device 5D) is deployed instead of the firewall 5B and the routers 6A and 6D. That is, in FIG. 10, the functions of the firewall 5B and the routers 6A and 6D are realized by the network device 5D which is a single device. When the functions of the routers 6B and 6C are not realized for the reason why the firewall 5A is managed by the user and the like (when the setting is not changed), the routers 6B and 6C may be deployed as illustrated in FIG. 8.

Similarly to FIG. 8, Tunnel A and Tunnel B are set in the network devices 5A and 5D. For example, path information (hereinafter, also referred to as first path information) for allowing a terminal in Segment A deployed in the region 8B (hereinafter, also referred to as a second physical machine group) to communicate with the region 8A via Tunnel A is stored in the network device 5D. For example, the first path information is stored such that a terminal in Segment A deployed in the region 8B communicates with the region 8A via Tunnel A when communicating with a virtual machine in Segment B deployed in the region 8B or a terminal deployed in the region 8A (hereinafter, also referred to as a first physical machine group). For example, path information (hereinafter, also referred to as second path information) for allowing a terminal in Segment B deployed in the region 8B to communicate with the region 8A via Tunnel B is stored in the network device 5D. For example, the second path information is stored such that a terminal in Segment B deployed in the region 8B communicates with the region 8A via Tunnel B when communicating with a virtual machine in Segment A deployed in the region 8B or a terminal deployed in the region 8A. That is, in the example illustrated in FIG. 10, similarly to description with reference to FIG. 8, communication between terminals in the same segment deployed in different regions is performed via Tunnel A or Tunnel B on the basis of the path information stored for each segment.

Similarly to the network device 5D, path information for allowing a terminal in Segment A deployed in the region 8A to communicate with the region 8B via Tunnel A is stored in the network device 5A. Path information for allowing a terminal in Segment B deployed in the region 8A to communicate with the region 8B via Tunnel B is also stored therein.

The information processing system 100 illustrated in FIG. 10 is constructed based on the template of the information processing system 100, similarly to description with reference to FIG. 8. Accordingly, terminals (the network device 5A and the virtual machines 3A, 3B, 3C, 3D, 3E, and 3F) of which information is included in the template of the information processing system 100 are set in the same way as in the information processing system 100 illustrated in FIG. 5. Therefore, when each terminal communicates with a terminal deployed in another segment, the communication is performed via the network device 5A.

[S1 of FIG. 9]

The path information managing process illustrated in FIG. 9 will be schematically described with reference to the information processing system 100 illustrated in FIG. 10. In the example illustrated in FIG. 9, it is assumed that a communication packet is transmitted from the virtual machine 3A deployed in the region 8B to the virtual machine 3F deployed in the region 8B.

First, the virtual machine 3A transmits the communication packet from the virtual machine 3A to the virtual machine 3F (S1). Specifically, the virtual machine 3A broadcasts the communication packet to all the terminals deployed in Segment A which is the same segment. Accordingly, the network device 5D can receive the communication packet transmitted from the virtual machine 3A.

[S2, S3, and S4 of FIG. 9]

Subsequently, the network device 5D stores information on the communication packet when the communication packet from the virtual machine 3A to the virtual machine 3F is received (S2). The information on the communication packet is, for example, information including a source IP address or a destination IP address of the communication packet and is information which can specify the communication packet. Details of the information on the communication packet will be described later. Then, the network device 5D transmits the received communication packet to the region 8A (S3). In the example illustrated in FIG. 10, the network device 5D is connected to the network device 5A deployed in the region 8A via Tunnel A. Accordingly, the network device 5D transmits the communication packet received from the virtual machine 3A to the network device 5A, for example, based on the path information (the first path information and the second path information) included in the template.

Then, the network device 5A checks the destination IP address of the communication packet and transmits the communication packet to Segment B in the region 8B in which the virtual machine 3F is deployed (S4). Specifically, the network device 5A transmits the received communication packet to Tunnel B.

[S5 and S6 of FIG. 9]

Subsequently, when the communication packet is received from the network device 5A, the network device 5D checks whether the received communication packet is the communication packet transmitted by the network device 5D in S3. When the received communication packet is the communication packet transmitted by the network device 5D, the network device 5D determines that the communication packet is the communication packet transmitted via the region 8A.

Specifically, the network device 5D determines whether the received packet is the packet transmitted by the network device 5D on the basis of the information on the communication packet stored in S2. Then, when the information on the communication packet corresponding to the received communication packet is stored, the network device 5D updates the path information so as to transmit the communication packet, which is transmitted from the virtual machine 3A to the virtual machine 3F, without passing through the region 8A (S5). Thereafter, the network device 5D transmits the received communication packet to the virtual machine 3F (S6). That is, for example, the network device 5D updates the path information so as to transmit the communication packet received from the virtual machine 3A to the virtual machine 3F directly instead of transmitting the communication packet to the region 8A. Then, when the communication packet transmitted from the virtual machine 3A to the virtual machine 3F is received again, the network device 5D performs communication based on the updated path information. When a communication packet transmitted from the virtual machine 3F to the virtual machine 3A is received after the path information is updated as described above, the network device 5D can perform communication without passing through the region 8A based on the updated path information.

That is, when it is determined that the received packet is the packet transmitted by the network device 5D, the network device 5D determines that the source (the virtual machine 3A) and the destination (the virtual machine 3F) of the communication packet are terminals deployed in the same region. The network device 5D determines that the source and the destination of the communication packet are terminals deployed in the same region but the received communication packet is transmitted via another region. When a communication packet having the same source and destination as the communication packet stored in S2 is received again, the network device 5D updates the path information so as to complete the transmission and reception of the communication packet through only the communication in the same region.

In this way, according to the first embodiment, when a communication packet from the virtual machine 3A to the virtual machine 3F is received, the network device 5D stores information on the received communication packet. Then, the network device 5D transmits the communication packet received from the virtual machine 3A to the region 8A based on the path information included in the template. Subsequently, when the communication packet transmitted by the network device 5D is received from the network device 5A, the network device 5D updates the path information based on the stored information on the communication packet so as to transmit a subsequent communication packet from the virtual machine 3A to the virtual machine 3F without passing through the region 8A. Then, when a subsequent communication packet from the virtual machine 3A to the virtual machine 3F is received, the network device 5D performs communication based on the updated path information. Accordingly, when the information processing system 100 is constructed based on the template on the premise that the information processing system is constructed in the same region, it is possible to suppress occurrence of unnecessary communication. It is also possible to achieve enhancement in communication efficiency. The provider does not have to change the path information even when the configuration of the information processing system 100 is changed due to migration or the like.

Details of First Embodiment

Figure 11:
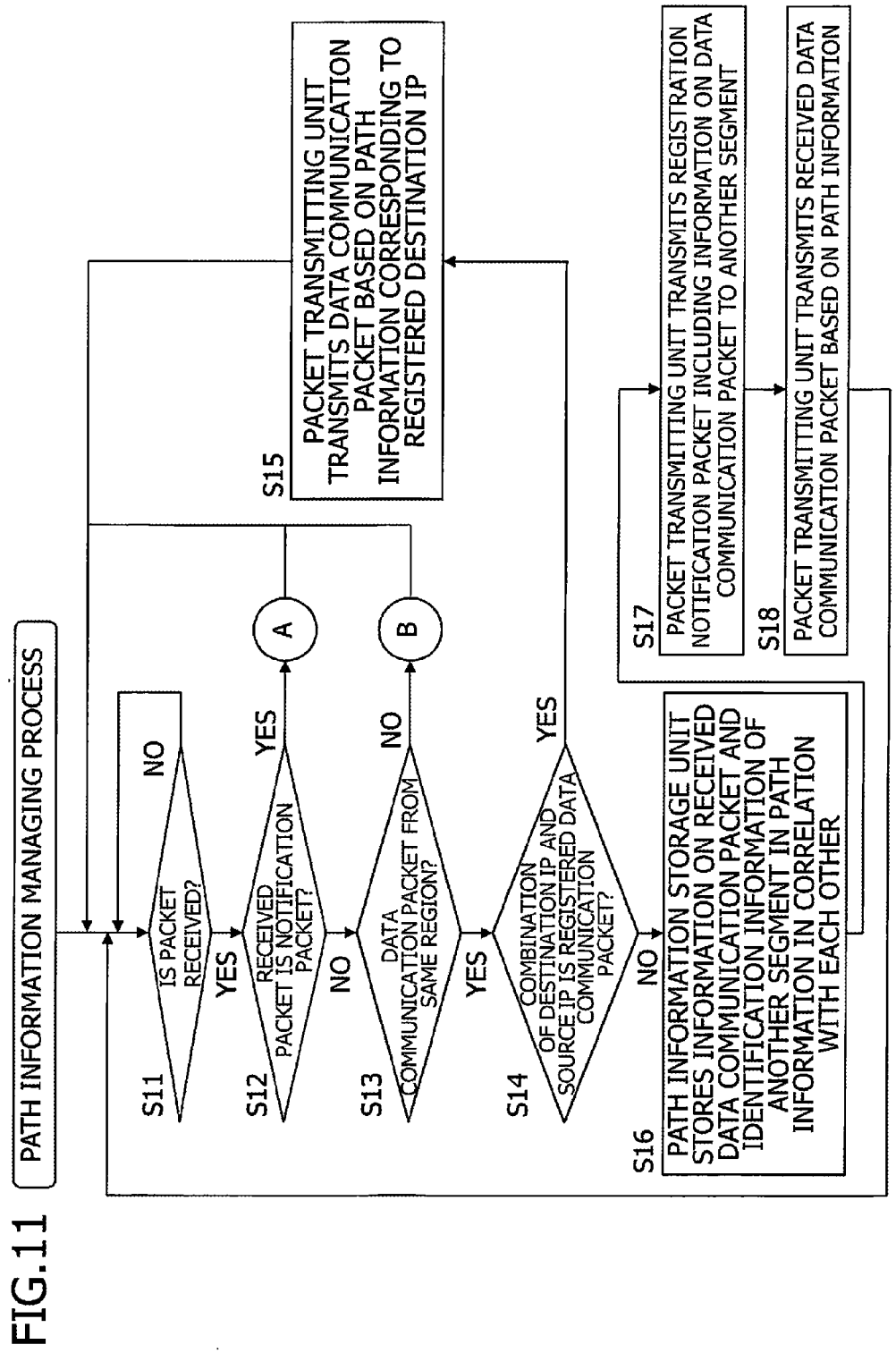
FIG. 11 is a flowchart illustrating details of the path information managing process according to the first embodiment.
Figure 12:
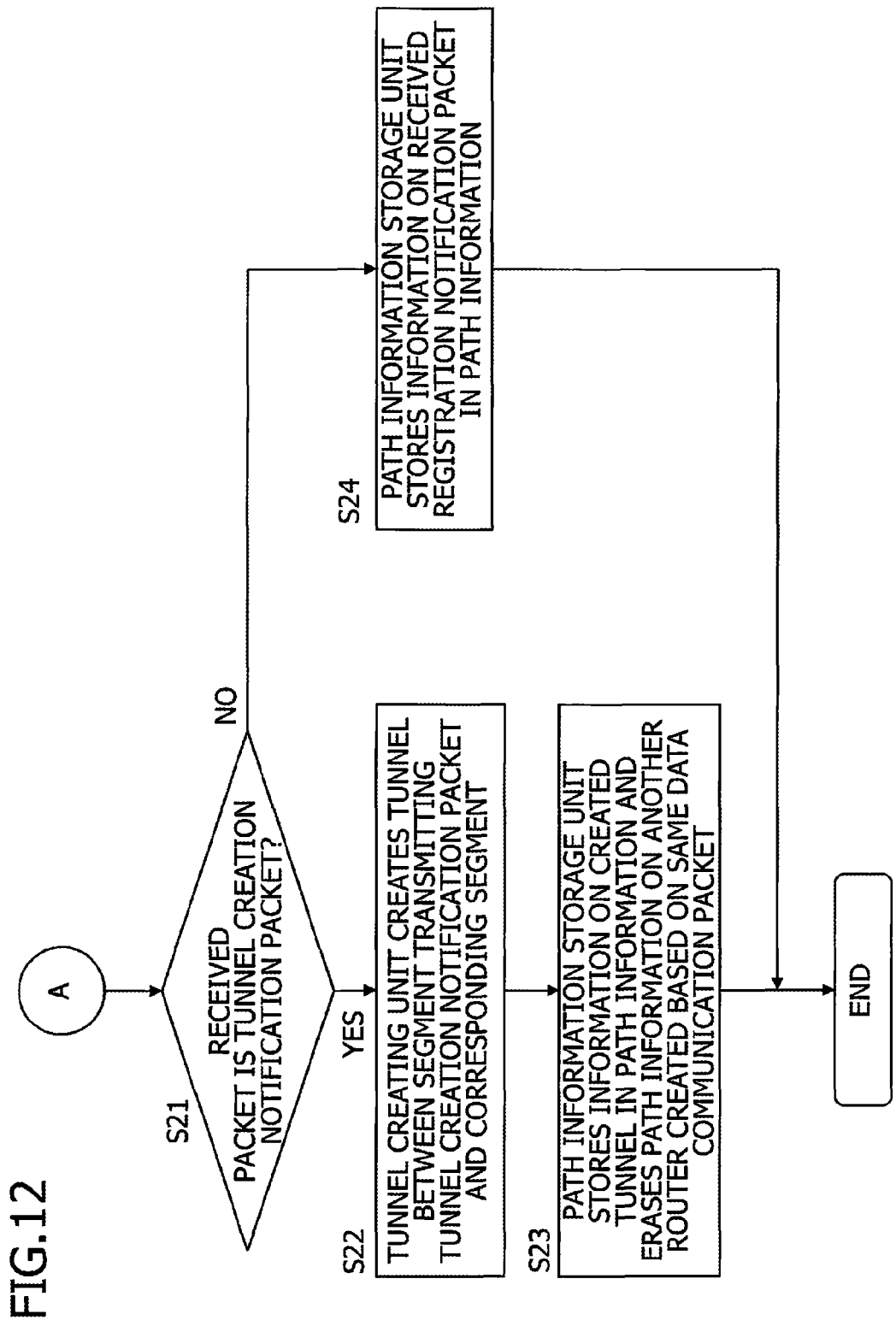
FIG. 12 is a flowchart illustrating details of the path information managing process according to the first embodiment.
Figure 13:
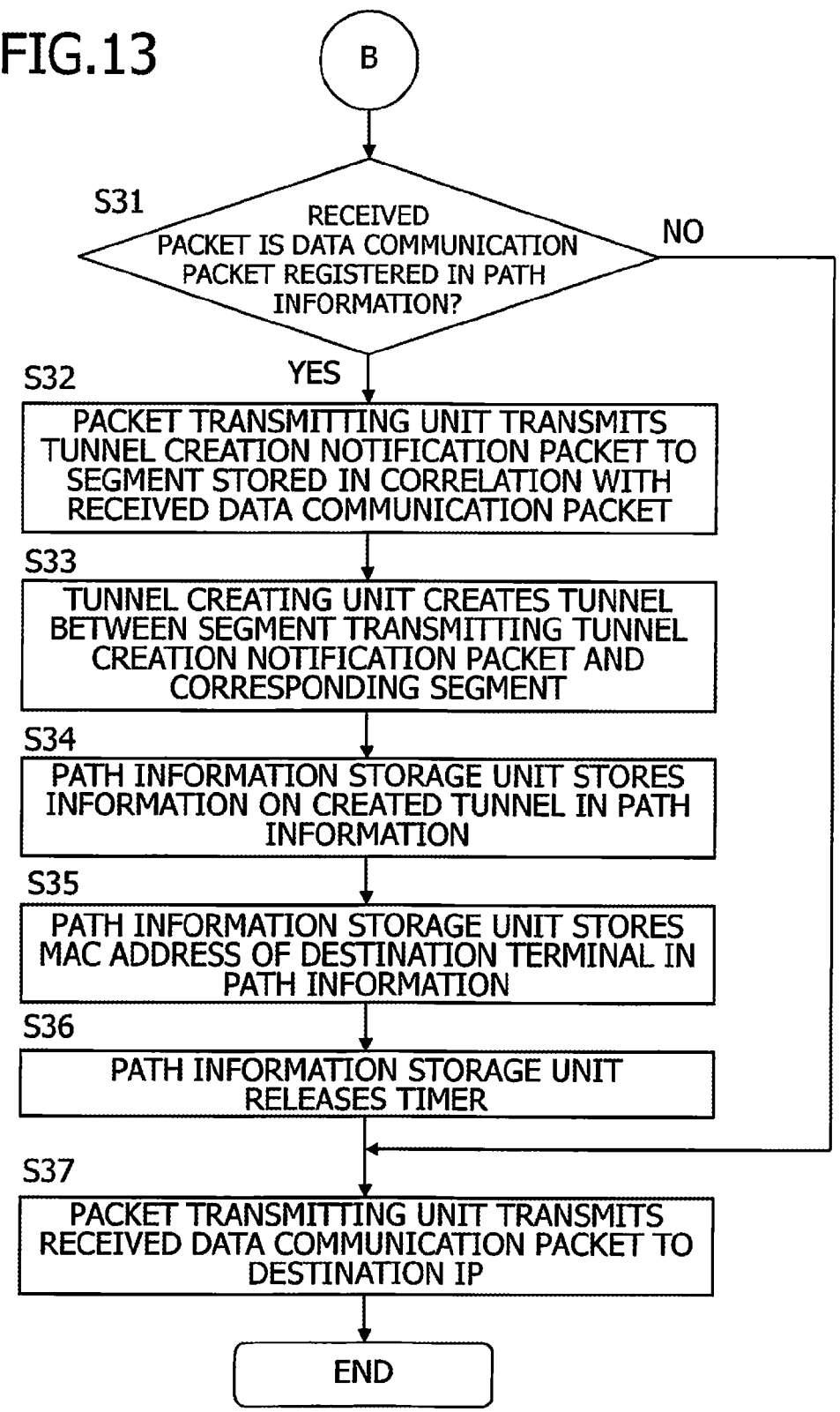
FIG. 13 is a flowchart illustrating details of the path information managing process according to the first embodiment.

Details of the first embodiment will be described below. FIG. 11 to FIG. 13 are flowcharts illustrating details of the path information managing process according to the first embodiment. FIG. 14 to FIG. 20B are diagrams illustrating details of the path information managing process according to the first embodiment. Details of the path information managing process illustrated in FIG. 11 to FIG. 13 will be described with reference to FIG. 14 to FIG. 20B. Specifically, in the following example, the path information managing processes which are performed in the router 6A (hereinafter, also referred to as a third network device 6A) and the router 6D (hereinafter, also referred to as a fourth network device 6B) illustrated in FIG. 14 will be described. On the other hand, FIG. 11 to FIG. 13 are flowcharts illustrating the path information managing process in the router 6A and the router 6D.

Figure 14:
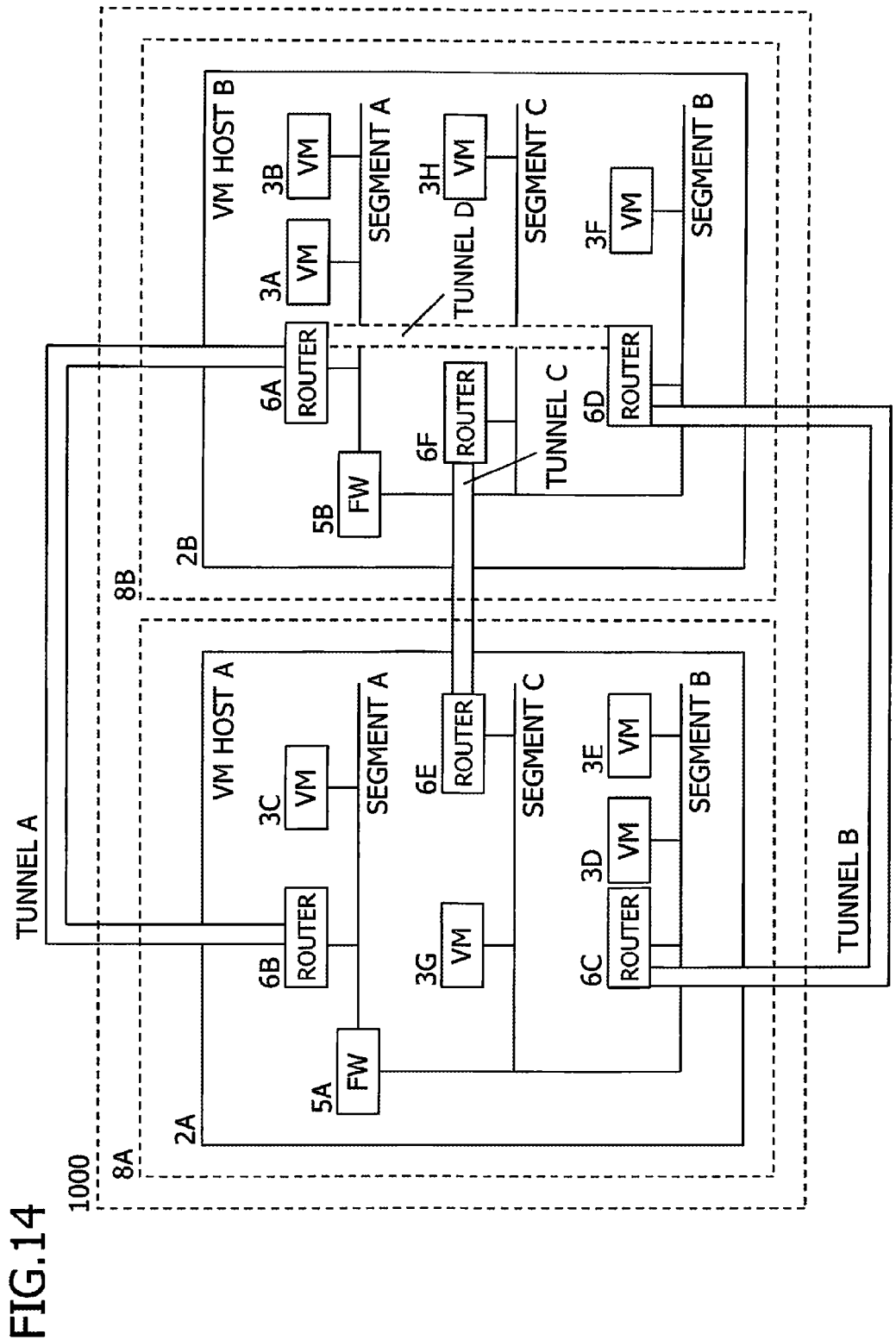
FIG. 14 is a diagram illustrating details of the path information managing process according to the first embodiment.

In an information processing system 1000 illustrated in FIG. 14, Segment C is present in the regions 8A and 8B, unlike the example illustrated in FIG. 8. A router 6E and a virtual machine 3G are deployed in Segment C of the region 8A, and a router 6F and a virtual machine 3H are deployed in Segment C of the region 8B. Tunnel C is set up between the router 6E and the router 6F. Tunnel D denoted by a dotted line in FIG. 14 is a tunnel which will be set up between the router 6A and the router 6B according to the first embodiment.

In the following example, a packet including data which is transmitted between virtual machines is referred to as a data communication packet, and a packet including information on a communication packet (such as an IP address of a source terminal) which is transmitted between routers or firewalls is referred to as a notification packet. The data communication packet and the notification packet are collectively referred to as a packet or a communication packet.

[Process when Router 6A Receives Data Communication Packet]

First, the process of the router 6A, when the router 6A receives a data communication packet, will be described with reference to FIG. 11. When the router 6A illustrated in FIG. 14 receives a data communication packet (YES in S11 and NO in S12), the router 6A checks whether the data communication packet is a data communication packet transmitted from the same region (S13). Then, when the received data communication packet is a communication packet transmitted from the same region (YES in S13), the router 6A checks the path information of the router 6A and checks whether a combination of IP addresses of the destination terminal and the source terminal of the received data communication packet is registered (S14). Then when the combination of the IP addresses of the destination terminal and the source terminal of the received data communication packet is not registered (NO in S14), the path information storage unit 211 of the router 6A stores, for example, information on the received data communication packet. Specifically, the path information storage unit 211 stores the information on the received data communication packet and identification information of another segment in the same region in the path information in correlation with each other (S16). The identification information of another segment may be, for example, a name of the segment or a name of a router deployed in the segment.

FIG. 15A and FIG. 15B are diagrams illustrating initial values of the path information of the router 6A and the router 6D. The path information of the router 6A and the path information of the router 6D in FIG. 14 correspond to the first path information and the second path information, respectively, in FIG. 9.

For example, the path information of the router 6A in the example illustrated in FIG. 15A includes items of "router ID," "IP address of destination terminal," "tunnel ID," "IP address of source terminal," "MAC address of source terminal," and "timer." "Router ID", "tunnel ID" and "timer" will be described later. In the example illustrated in FIG. 15A, "IP address of destination terminal," "IP address of source terminal," and "MAC address of source terminal" are included in the information on a data communication packet. That is, "IP address of destination terminal," "IP address of source terminal," and "MAC address of source terminal" are stored when each router receives a data communication packet.

Specifically, in the first row of the path information (hereinafter, also referred to as first information depending on the item "number") of the router 6A in the example illustrated in FIG. 15A, * is stored in the field of "IP address of destination terminal" and Tunnel A is stored in the field of "Tunnel ID." That is, the first information in the example illustrated in FIG. 15A indicates that a data communication packet received from a virtual machine in the same segment deployed in the same region as the router 6A in the example illustrated in FIG. 14 is transmitted to the router 6B via Tunnel A.

In the field of "router ID" of the second and third information in FIG. 15A, names of the router 6D and the router 6F as routers other than the router 6A which are present in the region 8B are stored. That is, the provider stores information of the routers, which have a possibility of creation of a tunnel with the router 6A, in the path information of the router 6A in advance.

On the other hand, in the example illustrated in FIG. 15A, names of the routers (routers through which a communication packet passes for communication with another region) connected to the tunnel are stored in the field of "router ID." On the contrary, the path information of the routers may have, for example, "segment ID" storing the names of segments present in the regions instead of "router ID." Hereinafter, "router ID" and "segment ID" are also referred to as identification information of a segment (identification information of a first segment or identification information of a second segment).

Similarly, in the first information in the router 6D in the example illustrated in FIG. 15B, * is stored in "IP address of destination terminal" and Tunnel B is stored in "tunnel ID." In the field of "router ID" of the second and third information in the example illustrated in FIG. 15B, the router 6A and the router 6F which are the names of the routers present in the same region as the router 6D are stored.

FIG. 16A and FIG. 16B are diagrams illustrating the path information of the router 6A and the router 6D when a data communication packet from the virtual machine 3A is received by the router 6A. In the example illustrated in FIG. 15A, information on a combination of the virtual machine 3A which is the source terminal of the data communication packet received by the router 6A and the virtual machine 3F which is the destination terminal thereof is not stored in the path information of the router 6A. The virtual machine 3A and the router 6A are present in the same region. Accordingly, the path information storage unit 211 stores information on the data communication packet received by the router 6A (YES in S11, NO in S12, YES in S13, NO in S14, S16).

In FIG. 16A, the path information storage unit 211 stores information on the data communication packet received from the virtual machine 3A as the identification information of the router 6D and the router 6F in correlation with the router 6D and the router 6F stored in "router ID" (the fourth and fifth information in FIG. 16A). Specifically, VM3F-IP which is the IP address of the virtual machine 3F as the "IP address of source terminal" and Tunnel A which is "tunnel ID" are stored in correlation with the router 6D and the router 6F. In addition, VM3A-IP which is the IP address of the virtual machine 3A as the "IP address of source terminal" and VM3A-MAC which is the MAC address of the virtual machine 3A as the "MAC address of source terminal" are stored in correlation with the router 6D and the router 6F (S16).

Referring to FIG. 11 again, the packet transmitting unit 213 of the router 6A transmits a registration notification packet including the information on a data communication packet to another segment (S17). Specifically, the packet transmitting unit 213 transmits information on the router 6D (the fourth information in FIG. 16A) to the router 6D among the path information stored in FIG. 16A and transmits information on the router 6F (the fifth information in FIG. 16A) to the router 6F. The registration notification packet is a kind of notification packet and is a packet used for a router receiving the data communication packet to notify another router deployed in the same region of the intent thereof.

Specifically, in the example illustrated in FIG. 17A and FIG. 17B, for example, when a data communication packet is received from the virtual machine 3A, the router 6A creates a registration notification packet including "IP address of destination terminal" and "IP address of source terminal" of the data communication packet and "router ID" which are stored in the fourth and fifth information in FIG. 17A. The router 6A transmits the created registration notification packet to the router 6D and the router 6F.

That is, the router 6A transmits the information on the data communication packet which is stored to another router deployed in the same region. Accordingly, when the data communication packet transmitted from the router 6A deployed in the same region is transmitted via another region, another router deployed in the same region can detect the fact.

Then, the packet transmitting unit 213 transmits the received data communication packet based on the path information (S18). That is, the packet transmitting unit 213 transmits the packet received from the virtual machine 3A to Tunnel A based on the first information in FIG. 17A.

On the other hand, when the communication of the IP addresses of the source terminal and the destination terminal of the data communication packet received by the router 6A is registered in the path information of the router 6A (NO in S14), the packet transmitting unit 213 transmits the data communication packet based on the path information corresponding to the registered IP address of the destination terminal (S15). In this case, the router 6A does not transmit the registration notification packet.

[Process when Router 6D Receives Registration Notification Packet]

The process of the router 6D when a registration notification packet is received from the router 6A will be described below with reference to FIG. 11 and FIG. 12. In FIG. 11 and FIG. 12, when the router 6D receives a registration notification packet from the router 6A in the same region (YES in S11, YES in S12, and NO in S21), the path information storage unit 211 of the router 6D stores the information on the received registration notification packet in the path information of the router 6D (S24).

Specifically, the router 6D receiving the registration notification packet stores, for example, the router 6A which is "router ID" included in the registration notification packet in "router ID" in the path information of the router 6D, as illustrated in the fourth information in FIG. 17B. Then, VM3F-IP which is the "IP address of destination terminal" included in the registration notification packet is stored in the "IP address of source terminal" in the path information of the router 6D in correlation with the stored "router ID." VM3A-IP which is the "IP address of source terminal" included in the registration notification packet is stored in the "IP address of destination terminal" in the path information of the router 6D in correlation with the stored "router ID." That is, by storing the information on the registration notification packet in the router 6D, the updating of the path information of the router 6A and the router 6D can be triggered when the router 6D receives a data communication packet transmitted from the router 6A.

When the registration notification packet is received, the router 6D turns on the item of "timer." That is, since the router 6A transmits the registration notification packet to all the other routers present in the same region, there is a case in which the other routers do not receive the data communication packet corresponding to the stored information on the registration notification packet. Accordingly, when a predetermined time (for example, 1 minute) passes after the registration notification packet is received and before the data communication packet corresponding to the stored information on the registration notification packet is received, the other routers can erase the information on the registration notification packet stored in the path information of the router 6D.

[Process when Router 6D receives Data Communication Packet]

The process when the router 6D receives a data communication packet transmitted by the router 6A will be described below with reference to FIG. 11 and FIG. 13.

In FIG. 11 and FIG. 13, when the router 6D receives a data communication packet from different regions (YES in S11, NO in S12, and NO in S13), the packet receiving unit 212 of the router 6D determines whether the received data communication packet is registered in the path information of the router 6D (S31). In the example illustrated in FIG. 17B, information on the registration notification packet transmitted by the router 6A is stored in the path information of the router 6D (YES in S31). Accordingly, the packet transmitting unit 213 of the router 6D transmits a tunnel creation notification packet to the router 6A stored in the information on the registration notification packet (S32). The tunnel creating unit 215 of the router 6D creates a tunnel between the router 6A having received the tunnel creation notification packet and the router 6D having transmitted the tunnel creation notification packet (S33), and the path information storage unit 211 of the router 6D stores information on the created tunnel in the path information of the router 6D.

Specifically, as illustrated in FIG. 18B, the router 6D stores the information of the created tunnel (Tunnel D) in the field of "tunnel ID" of the path information (the fourth information in FIG. 18B) (S34). The tunnel creation notification packet is a kind of communication packet and serves to notify the other routers deployed in the same region of the intent that a tunnel is set up to the router. The router having received the tunnel creation notification packet sets up a tunnel to the router having transmitted the tunnel creation notification packet. Accordingly, it is possible to set up a tunnel between routers having transmitted and received the tunnel creation notification packet. When the received data communication packet is registered in the path information of the router 6D but the "tunnel ID" of the path information is not registered, the packet transmitting unit 213 of the router 6D can transmit the tunnel creation notification packet (S32).

Referring to FIG. 13 again, the path information storage unit 211 of the router 6D stores the "MAC address of destination terminal" in the path information on the data communication packet received by the router 6D (S35). Specifically, as illustrated in FIG. 19B, information of VM3F-MAC as the "MAC address of destination terminal" of the data communication packet received by the router 6D is stored in the field of "MAC address of source terminal" in the path information (the fourth information in FIG. 19B).

That is, for example, when a tunnel is created between the router 6A and the router 6D and then a data communication packet is transmitted from the virtual machine 3A to the virtual machine 3F again, the virtual machine 3A and the virtual machine 3F belong to different segments and thus an ARP request does not reach each other. Accordingly, when the data communication packet from the virtual machine 3A to the virtual machine 3F is transmitted, the router 6D needs to transmit an ARP request and acquire the MAC address of the virtual machine 3F. Therefore, the router 6D in the example illustrated in FIG. 19B stores information of the MAC address of the virtual machine 3F in the path information on the tunnel between the virtual machine 3A and the virtual machine 3F. Accordingly, when the data communication packet is received from the virtual machine 3A, the router 6D can rewrite the MAC address of the data communication packet without transmitting an ARP request. As illustrated in FIG. 19A, even when the data communication packet transmitted from the virtual machine A is received by the router 6A, the "MAC address of source terminal" is stored in the path information of the router 6A (the fourth and fifth information) for the same reason as described above.

Referring to FIG. 13 again, the path information storage unit 211 of the router 6D erases (releases) a timer stored in the path information on the data communication packet received by the router 6D (S36). Accordingly, it is possible to prevent path information on the tunnel, which is created between the virtual machine 3A and the virtual machine 3F, from being erased. Then, the packet transmitting unit 213 of the router 6D transmits the data communication packet received from the region 8A to the IP address of the destination terminal included in the data communication packet (S37).

[Process when Router 6A Receives Tunnel Creation Notification Packet]

The process when the router 6A receives a tunnel creation notification packet transmitted from the router 6D will be described below with reference to FIG. 11 and FIG. 12.

In FIG. 11 and FIG. 12, when the router 6D receives a tunnel creation notification packet from a different region (YES in S11, YES in S12, and YES in S21), the tunnel creating unit 215 of the router 6A creates a tunnel between the router 6D having transmitted the tunnel creation notification packet and the router 6A (S22). Then, the path information storage unit 211 of the router 6A stores information on the created tunnel in the path information and erases the path information on the other routers created based on the same data communication packet (S23). Specifically, as illustrated in FIG. 20A, the router 6D updates the field of "tunnel ID" in the path information of the router A (the fourth information in FIG. 20A) corresponding to the path information (the fourth information in FIG. 20B) in which the field of "tunnel ID" is set to Tunnel D. Then, the setting of the tunnel between the router 6A and the router 6D is completed along with the setting of the tunnel which is performed by the tunnel creating unit 215 of the router 6D having transmitted the tunnel creation notification packet. Since the router 6A and the router 6D belong to different segments, the set tunnel D is, for example, an L3 tunnel that encapsulates information including IP addresses of the source terminal and the destination terminal (information not including the MAC addresses) and adds the information to a communication packet.

Accordingly, as illustrated in FIG. 20A, when a data communication packet from the virtual machine 3A to the virtual machine 3F is transmitted again, the router 6A transmits the data communication packet to Tunnel D set between the router 6A and the router 6D. As illustrated in FIG. 20B, when a data communication packet from the virtual machine 3F to the virtual machine 3A is received by the router 6D, the router 6D also transmits the data communication packet to Tunnel D. That is, it is possible to prevent a data communication packet which is transmitted later between the virtual machine 3A and the virtual machine 3F from being transmitted via the region 8A.

On the other hand, in FIG. 17B, the router 6D stores the "IP address of destination terminal" and the "IP address of source terminal" of the received registration notification packet in the path information (the fourth information in FIG. 17B) of the router 6D in a replacement manner. Accordingly, by setting a tunnel based on a data communication packet from the virtual machine 3A to the virtual machine 3F, it is possible to simultaneously set a tunnel on a data communication packet from the virtual machine 3F to the virtual machine 3A. Specifically, as illustrated in FIG. 20B, when a data communication packet from the virtual machine 3F to the virtual machine 3A is transmitted, the path information of the router 6D (the fourth information in FIG. 20B) is set such that the router 6F transmits the data communication packet to Tunnel D.

[Case in which Path Information does not Include Item of MAC Address of Source Terminal]

A case in which the path information does not include the item of MAC address of a source terminal will be described below. FIG. 21A and FIG. 21B are diagrams illustrating a case in which the path information does not include the item of MAC address of a source terminal in the first embodiment.

In FIG. 21A and FIG. 21B, the path information (the fourth information in FIG. 21A) when a communication packet is transmitted from the virtual machine 3A to the virtual machine 3F is stored. Here, since the virtual machine 3B is deployed in the same region and the same segment as the virtual machine 3A, a communication packet from the virtual machine 3B to the virtual machine 3F can be transmitted based on the updated path information (the fourth information in FIG. 21A). That is, when the path information does not include the "MAC address of source terminal", the path information does not need to include information for specifying the source terminal and thus includes only the region and the segment of the source terminal. Accordingly, when a source terminal deployed in the same region and the same segment as the source terminal, which is stored in the path information, communicates with a destination terminal stored in the path information, the communication can be performed based on the stored path information. Therefore, it is possible to suppress the number of times of performing the path information managing process described with reference to FIG. 15A and FIG. 15B, and the like. Since the path information for each terminal does not need to be stored, it is possible to suppress an amount of information to be stored in the path information.

On the other hand, when the path information does not include the item of "MAC address of source terminal," the path information storage unit 211 of each router does not need to store the "MAC address of source terminal" in the path information in FIG. 11 (S16). In FIG. 13, the path information storage unit 211 of each router does not need to store the MAC address of a destination terminal in the path information (S35).

[ARP Request Process]

Figure 22:
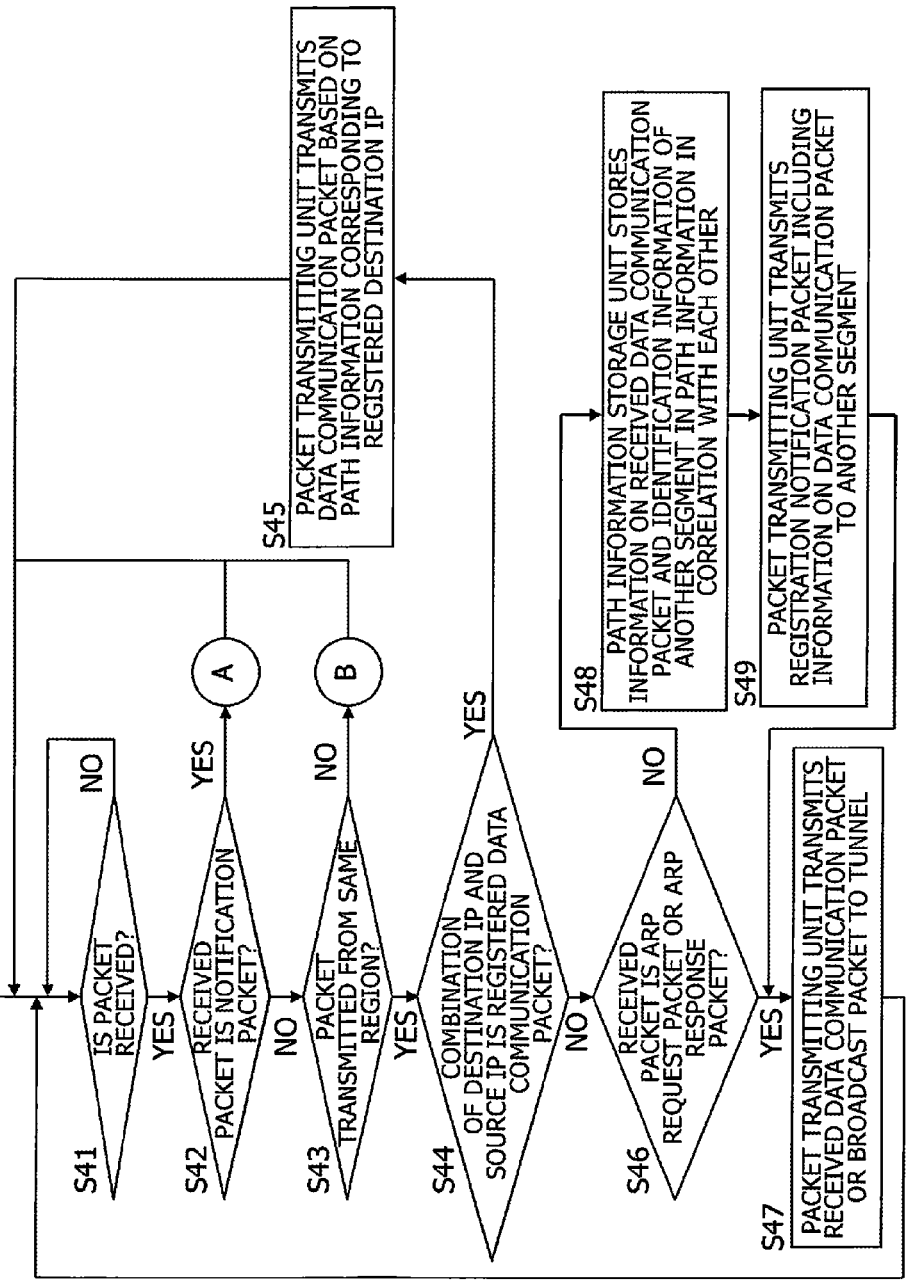
FIG. 22 is a flowchart illustrating the path information managing process including the ARP request process in the first embodiment.
Figure 23:
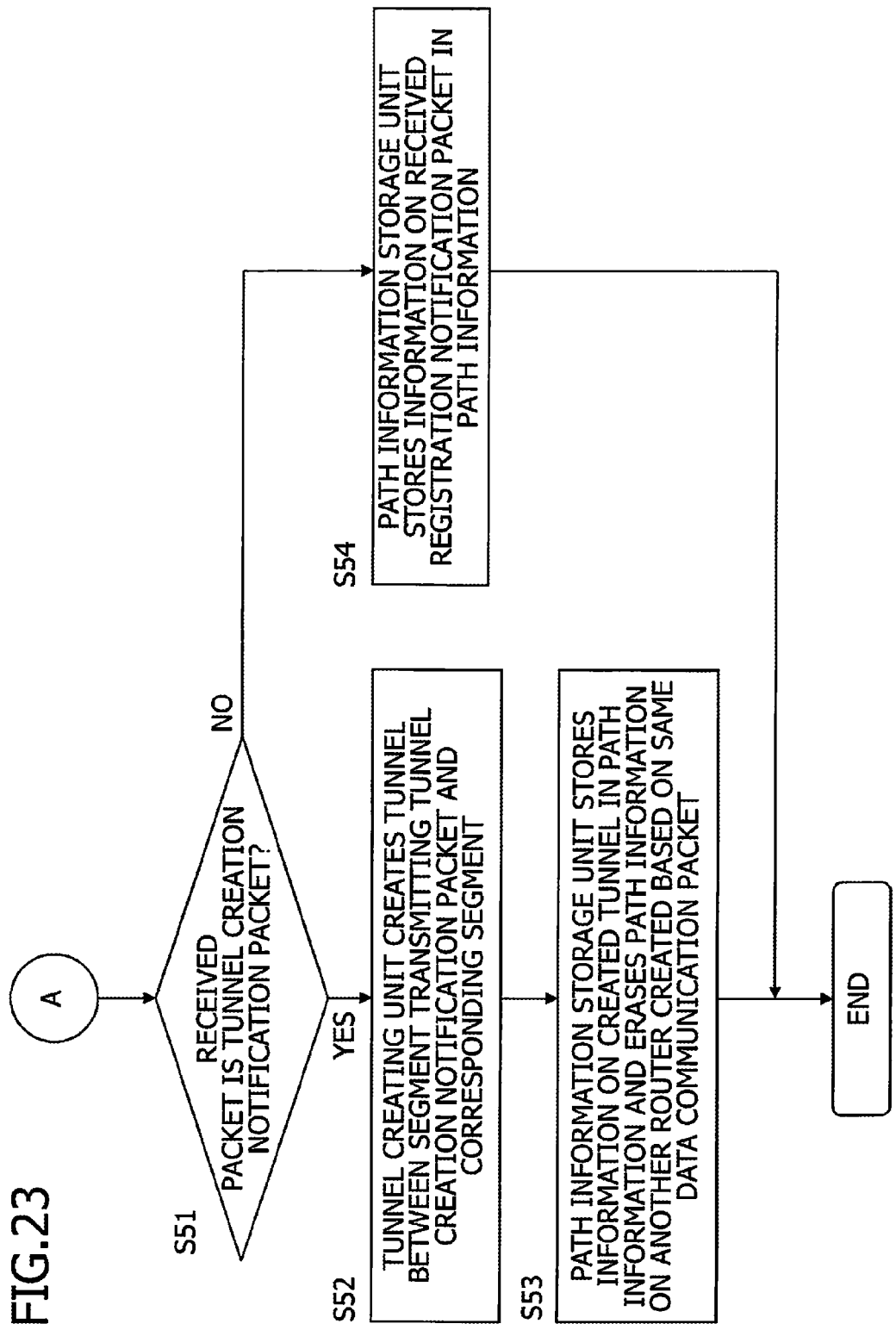
FIG. 23 is a flowchart illustrating the path information managing process including the ARP request process in the first embodiment.
Figure 24:
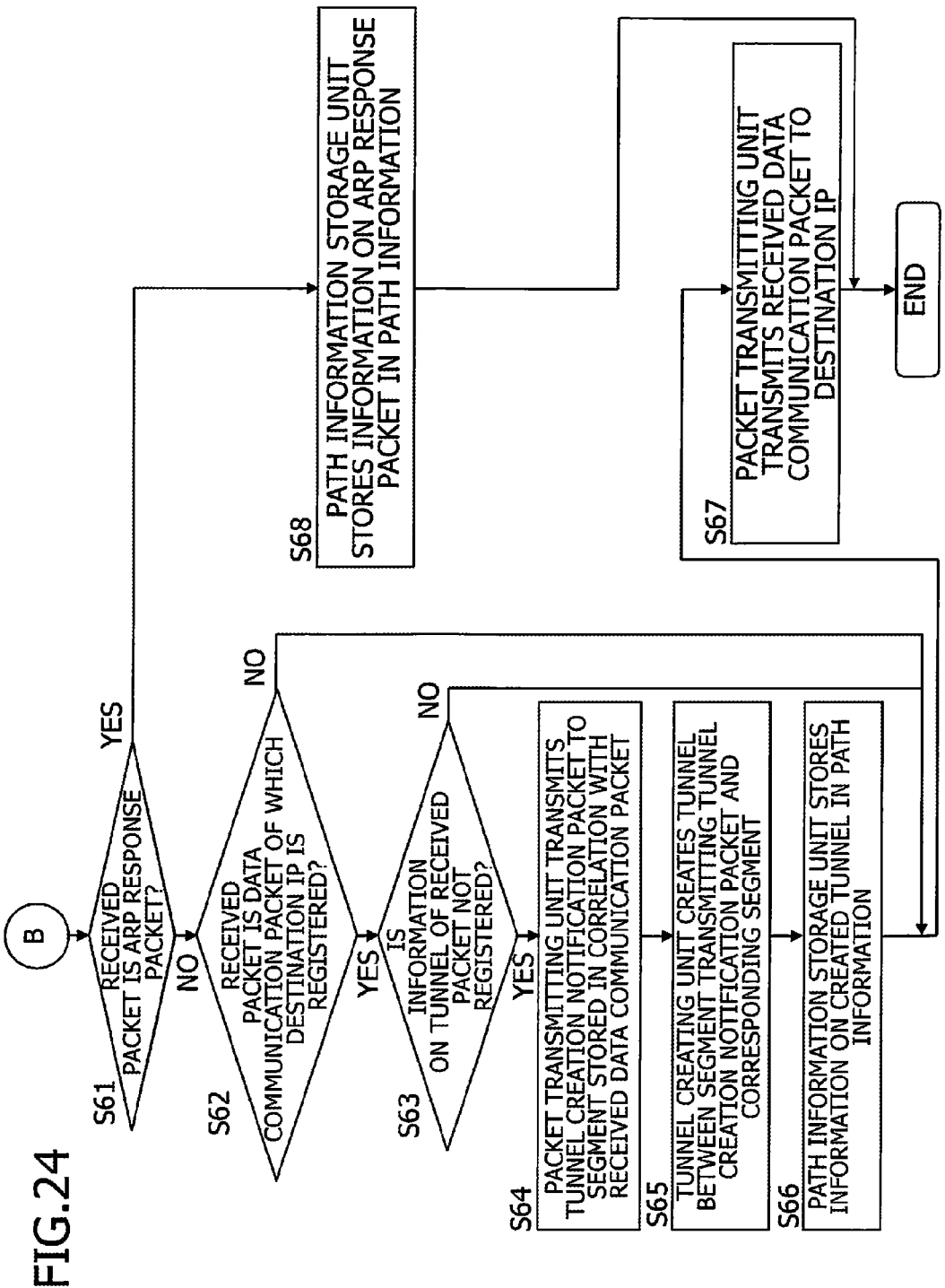
FIG. 24 is a flowchart illustrating the path information managing process including the ARP request process in the first embodiment.
Figure 25:
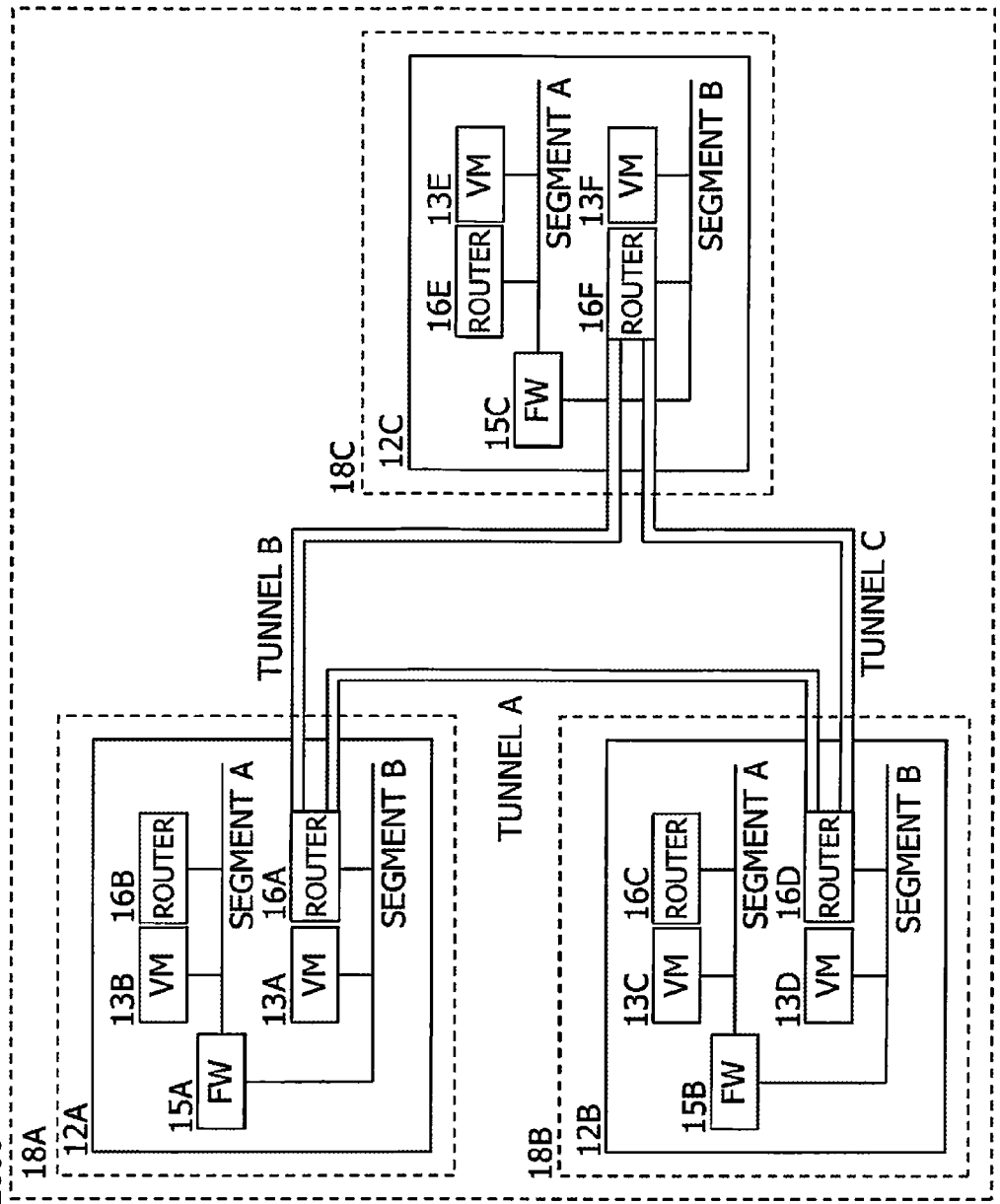
FIG. 25 is a diagram illustrating the ARP request process in the first embodiment.

An ARP request process will be described below. FIG. 22 to FIG. 24 are flowcharts illustrating the path information managing process including the ARP request process in the first embodiment. FIG. 25 to FIG. 27 are diagrams illustrating the ARP request process in the first embodiment. The ARP request process illustrated in FIG. 22 to FIG. 24 will be described below with reference to FIG. 25 to FIG. 27.

On the other hand, in the flowcharts of FIG. 22 to FIG. 24, a part related to the ARP request process is added to the flowcharts of FIG. 11 to FIG. 13. Differences from the flowcharts of FIG. 11 to FIG. 13 will be described below.

An information processing system 2000 illustrated in FIG. 25 is constructed to be laid across three regions, unlike the information processing system 1000 illustrated in FIG. 14. Routers illustrated in FIG. 25 are connected to two tunnels for communication with different regions. Accordingly, for example, when each terminal of the information processing system 2000 illustrated in FIG. 25 broadcasts a packet to perform a path information managing process, a packet which has to be transmitted to only one tunnel may be transmitted to two tunnels. Therefore, as illustrated in FIG. 25, when the path information managing process of the information processing system constructed to laid across three or more regions is performed, the ARP request process is performed before the path information managing process is performed.

In the ARP request process, MAC addresses of terminals which are present in the same segment are acquired based on the IP addresses of the terminals. Hereinafter, a packet which is transmitted from each terminal for an ARP request is referred to as an ARP request packet and a packet which is transmitted from each terminal for response to the ARP request is referred to as an ARP response packet.

Specifically, a terminal that performs an ARP request process broadcasts an ARP request packet to terminals in the same segment. Then, when the ARP request packet is received, the destination terminal of the ARP request packet transmits (unicasts) information on the MAC address of the terminal as an ARP response packet to the source terminal of the ARP request packet. Terminals other than the destination terminal of the ARP request packet do not need to transmit an ARP response packet in response to the received ARP request packet and thus discard the ARP request packet when the ARP request packet is received.

[System Configuration of FIG. 25]

The system configuration in the example illustrated in FIG. 25 will be described. In the example illustrated in FIG. 25, an information processing system is constructed to laid across regions 18A, 18B, and 18C, and VM hosts 12A, 12B, and 12C are equipped in the regions, respectively. A virtual machine 13B and a router 16B are deployed in Segment A in the VM host 12A, and a virtual machine 13A and a router 16A are deployed in Segment B in the VM host 12A. A virtual machine 13C and a router 16C are deployed in Segment A in the VM host 12B, and a virtual machine 13D and a router 16D are deployed in Segment B in the VM host 12B. A virtual machine 13E and a router 16E are deployed in Segment A in the VM host 12C, and a virtual machine 13F and a router 16F are deployed in Segment B in the VM host 12C. Segments A and Segments B in the VM hosts 12A, 12B, and 12C are connected via firewalls 15A, 15B, and 15C. Tunnels A, B, and C are set between the router 16A and the router 16D, between the router 16A and the router 16F, and between the router 16D and the router 16F, respectively. That is, the terminals in Segments B deployed in the respective regions can communicate with each other through Tunnels A, B, and C. In the example illustrated in FIG. 25, tunnels respectively set between the router 16B and the router 16C, between the router 16B and the router 16E, and between the router 16C and the router 16E are not illustrated. In the example illustrated in FIG. 25, it is assumed that each router is set so as not to transmit a communication packet, which is received by the router from the tunnels, to another tunnel in order to prevent occurrence of a loop due to the communication packet.

[Process when Router 16A Receives ARP Request Packet]

The process when the router 16A receives an ARP request packet transmitted from the virtual machine 13A to the virtual machine 13D will be described below with reference to FIG. 22.

In FIG. 22, When the packet receiving unit 212 of the router 16A receives an ARP request packet transmitted from the virtual machine 13A deployed in the same region as the router 16A (YES in S41, NO in S42, YES in S43, NO in S44, and YES in S46), the packet transmitting unit 213 of the router 16A transmits the received ARP request packet to a tunnel (S47). Specifically, in the example illustrated in FIG. 25, the router 16A transmits the received ARP request packet to Tunnel A and Tunnel B set in the router 16A. The router 16F having received the ARP request packet via Tunnel B transmits the ARP request packet to only Segment B of the region 18C so as not to transmit a communication packet received from the set tunnel to other tunnels to prevent occurrence of a loop or the like. The virtual machine 13F and the firewall 15C deployed in Segment B of the region 18C discard the received ARP request packet.

[Process when Router 16D Receives ARP Request Packet]

The process when the packet receiving unit 212 of the router 16D receives an ARP request packet transmitted from the router 16A to Tunnel A will be described below with reference to FIG. 22.

In FIG. 22, when the packet receiving unit 212 of the router 16D receives an ARP request packet transmitted from the router 16A via Tunnel A (YES in S41, NO in S42, YES in S43, and YES in S44), the packet transmitting unit 213 of the router 16D transmits the received ARP request packet to the terminals in Segment B deployed in the region 18B (S45). In the example illustrated in FIG. 25, the packet transmitting unit 213 of the router 16D transmits the ARP request packet to the virtual machine 13D and the firewall 15B.

[Process when Router 16D Receives ARP Response Packet]

The process when the router 16D receives an ARP response packet from the virtual machine 13D which is a destination terminal of an ARP request packet will be described below with reference to FIG. 22.

In FIG. 22, when the router 16D receives an ARP response packet from the virtual machine 13D which is a destination terminal of an ARP request packet (YES in S41, NO in S42, YES in S43, NO in S44, and YES in S46), the packet transmitting unit 213 of the router 16D transmits the received ARP response packet to the tunnels (S47). Specifically, in the example illustrated in FIG. 25, the router 16D transmits the received ARP response packet to Tunnel A and Tunnel C set in the router 16D. The ARP response packet transmitted to Tunnel C is discarded by the router 16F.

[Process when Router 16A Receives ARP Response Packet]

The process when the packet receiving unit 212 of the router 16A receives an ARP response packet transmitted from the router 16D via Tunnel A will be described below with reference to FIG. 22 and FIG. 24.

In FIG. 22 and FIG. 24, when the packet receiving unit 212 of the router 16A receives an ARP response packet transmitted from the router 16D to Tunnel A (YES in S41, NO in S42, NO in S43, and YES in S61), the path information storage unit 211 of the router 16A stores information on the ARP response packet in the path information of the router 16A (S68).

FIG. 26 is a diagram illustrating initial values of the path information of the router 16A. Specifically, in the first information of the router 16A in the example illustrated in FIG. 26, * is stored in "IP address of destination terminal" and "Tunnel A and Tunnel B" are stored in "Tunnel ID." That is, the first information of the router 16A in the example illustrated in FIG. 26 indicates that a data communication packet received from a virtual machine in the same segment deployed in the same region as the router 6A in the example illustrated in FIG. 25 is transmitted to the router 16D via Tunnel A and is transmitted to the router 16F via Tunnel B. On the other hand, the router name of the router 16B deployed in the same region 18A as the router 16A is stored in "router ID" in the second path information of the router 16A.

FIG. 27 illustrates an example in which the router 16A receives an ARP response packet transmitted from the virtual machine 13D having received an APR request packet from the virtual machine 13A. Specifically, in the example illustrated in FIG. 25, the router 16A receives an ARP response packet in response to an ARP request packet transmitted from the virtual machine 13A to the virtual machine 13D via Tunnel A. Accordingly, as illustrated in FIG. 27, the router 16A stores VM13D-IP as the "IP address of destination terminal" in the path information of the router 16A (the third information in FIG. 27) and stores Tunnel A as "tunnel ID." Accordingly, when a communication packet from a terminal (for example, the virtual machine 13A) in Segment B deployed in the same region 18A to the virtual machine 13D is received, the router 16A transmits the communication packet to Tunnel A without transmitting the communication packet to Tunnel B.

That is, when an information processing system is constructed to be laid across three or more regions, the ARP request process is performed to specify a communication path from a source terminal to a destination terminal before the path information managing process is performed. Accordingly, it is possible to not transmit a communication packet to regions other than the region in which the source terminal is deployed and the region in which a default routing of the source terminal is deployed in the path information managing process. Therefore, in addition to improvement in communication efficiency between the region in which the source terminal is deployed and the region in which the default routing of the source terminal is deployed, it is possible to achieve improvement in communication efficiency between the regions and the other regions through the path information managing process.

Second Embodiment

Figure 28:
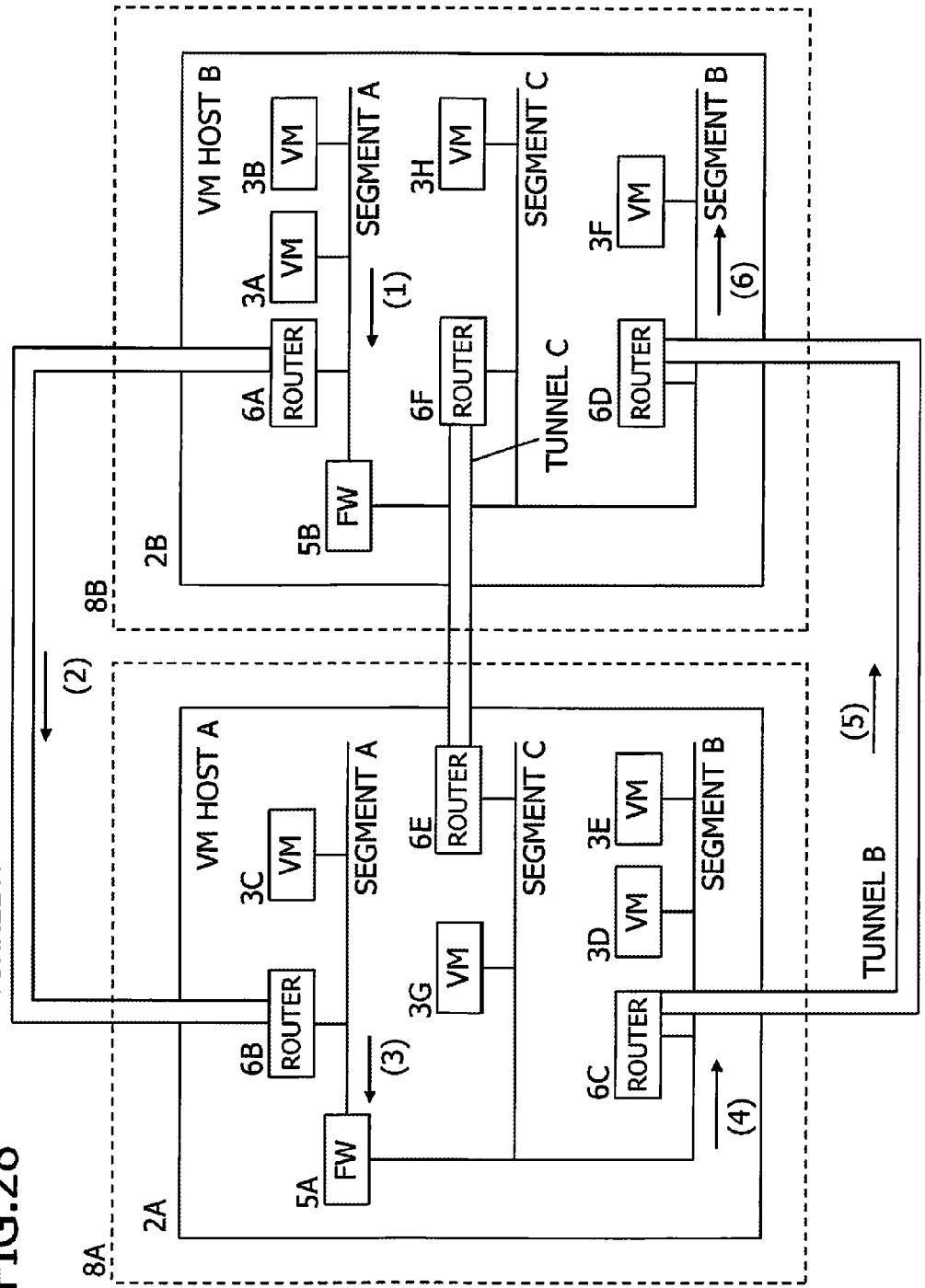
FIG. 28 is a diagram illustrating a path information managing process according to the second embodiment.
Figure 29:
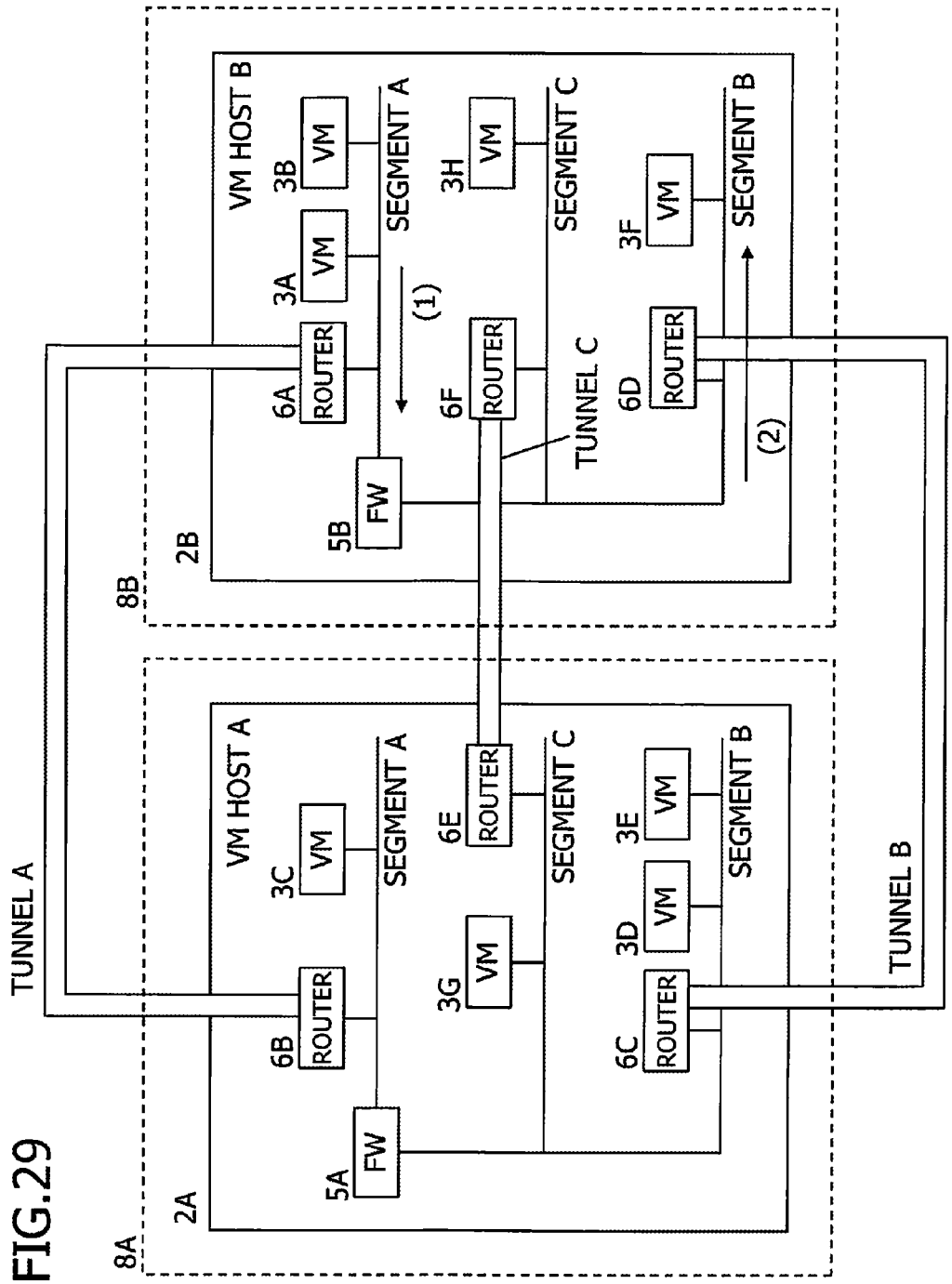
FIG. 29 is a diagram illustrating a path information managing process according to the second embodiment.

A second embodiment will be described below. FIG. 28 to FIG. 30 are diagrams illustrating a path information managing process according to the second embodiment. Here, FIG. 28 and FIG. 29 are diagrams based on FIG. 14.

In the second embodiment, unlike in the first embodiment, the path information is updated, for example, based on the number of hops from a source terminal of a data communication packet to a destination terminal.

FIG. 28 is a diagram illustrating a case in which a data communication packet from the virtual machine 3A to the virtual machine 3F is transmitted via the region 8A. In FIG. 28, the data communication packet transmitted by the virtual machine 3A is transmitted in the order of (1) the router 6A, (2) the router 6B, (3) the firewall 5A, (4) the router 6C, (5) the router 6D, and (6) the virtual machine 3F. That is, when the number of hops is counted whenever passing the terminals, the number of hops until the data communication packet transmitted from the virtual machine 3A is transmitted to the virtual machine 3F in the example illustrated in FIG. 28 is six.

On the other hand, FIG. 29 is a diagram illustrating a case in which a data communication packet from the virtual machine 3A to the virtual machine 3F is transmitted without passing through the region 8A. In the example illustrated in FIG. 29, the data communication packet transmitted by the virtual machine 3A is transmitted in the order of (1) the firewall 5B and (2) the virtual machine 3F. That is, the number of hops until the data communication packet transmitted from the virtual machine 3A is transmitted to the virtual machine 3F in the example illustrated in FIG. 29 is two. That is, when each router sets the path information based on the number of hops for communication, a path from the virtual machine 3A to the virtual machine 3F is the path illustrated in FIG. 29.

FIG. 30 illustrates an example of the path information of the router 6A in FIG. 29. In FIG. 30, unlike FIG. 15A and FIG. 15B and the like, the item of "tunnel ID" is changed to "tunnel ID (IP address of terminal)." That is, in FIG. 30, when the router 6A transmits a packet to a tunnel, information on the tunnel is stored in the item of to "tunnel ID (IP address of terminal)." When the router 6A does not transmit a packet to a tunnel but transmits a packet to a terminal, information on the terminal is stored in the item of to "tunnel ID (IP address of terminal)."

Specifically, in FIG. 30, FW5B which is the name of a terminal instead of the name of a tunnel is stored in the path information (the fourth information in FIG. 30) in which "IP address of destination terminal" is VM3F-IP indicating the IP address of the virtual machine 3F. That is, when the router 6A transmits a packet from the virtual machine 3A to the virtual machine 3F, communication is performed via the firewall 5B without passing through a tunnel. In FIG. 30, Tunnel A which is the name of a tunnel is stored in the path information (the fifth information in FIG. 30) in which the "IP address of destination terminal" is VM3C-IP indicating the IP address of the virtual machine 3C.

In this way, in the second embodiment, when the terminals deployed in different segments of the same region communicate with each other, for example, the number of hops of each communication path is acquired. Accordingly, each router can update the path information without setting a tunnel.

In the second embodiment, for example, each router may acquire communication times for transmission of a packet via communication paths and may update the path information so as to set the communication path having the shortest communication time as the communication path of a packet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication method comprising:
when a first communication packet transmitted from a first terminal which is deployed in a second physical machine group and included in a first segment is received, storing, by a second network device, identification information of the first communication packet transmitted from the first terminal, the second network device being included in a second information processing system that is constructed based on configuration information of a first information processing system including a first network device and that is provided across a first physical machine group in which the first network device is deployed and the second physical machine group in which the second network device not included in the first information processing system is deployed;
first transmitting, by the second network device, the first communication packet transmitted from the first terminal to the first network device based on path information included in the configuration information when the first communication packet transmitted from the first terminal is a communication packet to a second terminal included in a second segment;
when the first communication packet is transmitted from the first network device, second transmitting, by the second network device, the received first communication packet transmitted from the first network device to the second terminal and updating, by the second network device, the path information so as to transmit a communication packet transmitted from the first terminal without passing through the first network device; and
performing, by the second network device, transmission based on the updated path information when a communication packet transmitted from the first terminal to the second terminal is received.

2. The communication method according to claim 1, wherein the storing is performed when the first communication packet transmitted from the first terminal is transmitted to the second terminal.

3. The communication method according to claim 1, wherein the storing includes storing, by the second network device, the identification information correlated with identification information of the first segment in the path information.

4. The communication method according to claim 1, wherein
the second network device includes a third network device deployed in the first segment and a fourth network device deployed in the second segment,
the storing includes:
transmitting, by the third network device, the identification information to the fourth network device, and
storing, by the fourth network device, the identification information transmitted from the third network device.

5. The communication method according to claim 4, wherein the updating includes, when the fourth network device receives the first communication packet from the third network device via the first network device, updating, by the fourth network device, the path information based on the identification information transmitted from the third network device.

6. The communication method according to claim 4, wherein the updating includes erasing, by the fourth network device, the identification information transmitted from the third network device when a predetermined time passes after the fourth network device receives the identification information transmitted from the third network device and before the fourth network device receives the first communication packet transmitted from the first network device.

7. The communication method according to claim 4, wherein the updating includes:
creating, by the third network device or the fourth network device, a communication tunnel between the third network device and the fourth network device, and
updating, by the third network device or the fourth network device, the path information such that a communication packet transmitted from the first terminal to the second terminal passes through the created communication tunnel.

8. The communication method according to claim 1, wherein the updating includes updating, by the second network device, the path information such that a communication packet transmitted from the first terminal is transmitted to the second terminal via a shortest path.

9. The communication method according to claim 8, wherein the shortest path is a path in which a communication time from the first terminal to the second terminal is shortest or a path in which the number of hops from the first terminal to the second terminal is smallest.

10. The communication method according to claim 1, further comprising:
specifying, by the second network device, a communication path from the first terminal to the second terminal by performing communication from the second network device to the second terminal; and
storing, by the second network device, the specified communication path in the path information before the first transmitting.

11. The communication method according to claim 1, wherein the identification information includes information including IP addresses of the first and second terminals, identification information of the first segment, and a MAC address of the first terminal.

12. A non-transitory computer-readable storage medium storing therein a communication program for causing a computer to execute a process comprising:
    when a first communication packet transmitted from a first terminal which is deployed in a second physical machine group and included in a first segment is received, storing, by a second network device, identification information of the first communication packet transmitted from the first terminal, the second network device being included in a second information processing system that is constructed based on configuration information of a first information processing system including a first network device and that is provided across a first physical machine group in which the first network device is deployed and the second physical machine group in which the second network device not included in the first information processing system is deployed;
    first transmitting, by the second network device, the first communication packet transmitted from the first terminal to the first network device based on path information included in the configuration information when the first communication packet transmitted from the first terminal is a communication packet to a second terminal included in a second segment;
    when the first communication packet is transmitted from the first network device, second transmitting, by the second network device, the received first communication packet transmitted from the first network device to the second terminal and updating, by the second network device, the path information so as to transmit a communication packet transmitted from the first terminal without passing through the first network device; and
    performing, by the second network device, transmission based on the updated path information when a communication packet transmitted from the first terminal to the second terminal is received.

* * * * *